United States Patent
Dahl et al.

(10) Patent No.: US 9,152,276 B2
(45) Date of Patent: Oct. 6, 2015

(54) ACOUSTIC MOTION DETERMINATION

(75) Inventors: Tobias Dahl, Oslo (NO); Tom Øystein Kavli, Oslo (NO); Trine Kirkhus, Oslo (NO)

(73) Assignee: Elliptic Laboratories AS, Olso (NO)

( * ) Notice: Subject to any disclaimer, the term of this patent is extended or adjusted under 35 U.S.C. 154(b) by 0 days.

(21) Appl. No.: 13/497,759

(22) PCT Filed: Sep. 22, 2010

(86) PCT No.: PCT/GB2010/051593
§ 371 (c)(1),
(2), (4) Date: Jun. 13, 2012

(87) PCT Pub. No.: WO2011/036486
PCT Pub. Date: Mar. 31, 2011

(65) Prior Publication Data
US 2012/0243374 A1    Sep. 27, 2012

(30) Foreign Application Priority Data
Sep. 23, 2009   (GB) .................................. 0916707.3

(51) Int. Cl.
| | |
|---|---|
| G01S 15/00 | (2006.01) |
| H03K 17/94 | (2006.01) |
| H03M 11/00 | (2006.01) |
| G01B 5/02 | (2006.01) |
| G06F 3/033 | (2013.01) |
| G06F 3/043 | (2006.01) |

(52) U.S. Cl.
CPC ...... *G06F 3/043* (2013.01); *G06F 2203/04101* (2013.01)

(58) Field of Classification Search
USPC ........... 702/150–171; 715/863; 345/156–158; 341/20–22; 463/7
See application file for complete search history.

(56) References Cited

U.S. PATENT DOCUMENTS

| | | | | |
|---|---|---|---|---|
| 5,059,959 | A  * | 10/1991 | Barry | 345/168 |
| 7,414,705 | B2 * | 8/2008 | Boillot | 356/5.01 |
| 7,617,731 | B2 * | 11/2009 | Suginouchi et al. | 73/602 |
| 8,169,404 | B1 * | 5/2012 | Boillot | 345/158 |
| 2007/0132743 | A1 | 6/2007 | Bayramoglu | |
| 2007/0288194 | A1 * | 12/2007 | Boillot | 702/150 |
| 2008/0100572 | A1 * | 5/2008 | Boillot | 345/158 |
| 2008/0281523 | A1 * | 11/2008 | Dahl et al. | 702/5 |

FOREIGN PATENT DOCUMENTS

| | | |
|---|---|---|
| JP | 2007-065800 | 3/2007 |
| WO | WO 99/35745 | 7/1999 |

OTHER PUBLICATIONS

International Search Report and Written Opinion dated Feb. 8, 2011, PCT Patent Application No. PCT/GB2010/051593, filed Sep. 22, 2010.

* cited by examiner

*Primary Examiner* — Firmin Backer
*Assistant Examiner* — Jerold Murphy
(74) *Attorney, Agent, or Firm* — Beyer Law Group LLP

(57) ABSTRACT

The motion of an object is characterized by transmitting acoustic signals over first and second transmitter-receiver channels. Information relating to signals received over the first channel is compared with information relating to signals received over the second channel, to identify a similar pattern in both channels arising from reflections from the object. A relative timing difference between the channels, associated with the similar pattern, is used to characterize the motion of the object.

25 Claims, 8 Drawing Sheets

| Table 1: k-nn, k=3, based on projection onto first 7 components ||||||||
| C/C^ | Left | Right | Up | Down | Hit | Doubt | Correct outside doubt | Doubt% |
| --- | --- | --- | --- | --- | --- | --- | --- | --- |
| Left | 96 | 0 | 3 | 0 | 1 | 0 | 96 | 0 |
| Right | 0 | 91 | 0 | 5 | 2 | 2 | 93 | 2 |
| Up | 4 | 0 | 93 | 0 | 3 | 1 | 93 | 1 |
| Down | 0 | 1 | 1 | 97 | 1 | 0 | 97 | 0 |
| Hit | 2 | 2 | 2 | 0 | 94 | 0 | 94 | 0 |
| Random | 2 | 8 | 0 | 2 | 6 | 82 | NaN | 82 |

ACOUSTIC MOTION DETERMINATION

RELATED APPLICATIONS

This application is the National Stage of International Application No. PCT/GB2010/051593, filed Sep. 22, 2010, which claims the benefit of GB 0916707.3, filed Sep. 23, 2009. Each of these applications is hereby expressly incorporated by reference in its entirety herein.

BACKGROUND

This invention relates to characterising the motion of one or more objects using acoustic signals; particularly, although not exclusively, using ultrasound.

It is known to track finger movements for touchless interaction with a computing device with an ultrasonic transmitter and a number of receivers using time-of-flight measurements. Indeed various proposals for such tracking have been made— e.g. in US patent application US 2006/0161871 by Apple Inc.®, which relates particularly to input to a handheld device. However these proposals have shortcomings. In particular, they can be sensitive to noise caused by changes in the shape or view-angle of the finger, or interference from one or more other objects.

Optical tracking based on time-of-flight principles has also been attempted; however, the technology is complex and costly, due in part to the need for optical components and the very high clock-speeds required. Furthermore, it is impossible to flush-mount a camera having a wide (e.g. 180-degree) field of view, meaning that camera lenses must partly project from the surface of the device so that they are exposed to damage and contamination, as well as being potentially less aesthetically-pleasing.

The disclosed embodiments aim to take a different approach.

SUMMARY

When viewed from a first aspect the invention provides a method of characterising the motion of an object comprising:
 continuously or discretely transmitting acoustic transmit signals over first and second channels, each channel comprising at least one transmitter and at least one receiver, wherein the received signals on each channel comprise reflections from the object;
 comparing information relating to signals received over the first channel with information relating to signals received over the second channel to identify a similar pattern in both channels arising from reflections from the object; and
 using one or more relative timing differences between the channels, associated with the similar pattern, to characterise the motion of the object.

The invention extends to apparatus for characterising the motion of an object comprising:
 transmission means arranged to transmit acoustic signals;
 receiving means arranged to receive signals and, with the transmission means, defining first and second channels, wherein the received signals on each channel comprise reflections from the object; and
 processing means configured to compare information relating to signals received over the first channel with information relating to signals received over the second channel to identify a similar pattern in both channels arising from reflections from the object; and to use one or more relative timing differences between the channels, associated with the similar pattern, to characterise the motion of the object.

The invention also extends to a computer software product, and to a carrier bearing the same, configured, when run on a computer, to characterise the motion of an object comprising:
 instructions for continuously or discretely transmitting acoustic transmit signals over first and second channels, each channel comprising at least one transmitter and at least one receiver, wherein the received signals on each channel comprise reflections from the object;
 logic for comparing information relating to signals received over the first channel with information relating to signals received over the second channel to identify a similar pattern in both channels arising from reflections from the object; and
 logic for using one or more relative timing differences between the channels, associated with the similar pattern, to characterise the motion of the object.

Thus it will be seen by those skilled in the art that, rather than determining the time-of-arrival of a single, strongest or leading edge reflection from the object arising from a single transmit pulse in each channel, instead, in accordance with the present invention, a comparison of patterns occurring in the received signals, or information derived from them, is undertaken in order to characterise the motion of the object. As used herein a pattern is not a single point or value, but rather a set of values—e.g. of acoustic energies, amplitudes or signal portions. No traditional time-of-flight or ellipsoid-intersection calculation need be carried out in order to characterise the motion sufficiently for useful application to, say, user input to an electronic device or appliance.

This approach is more robust to noise and interference than certain prior art approaches, since the similar pattern may be representative of attributes of the object beyond a simple point location in space—e.g. its shape, composition, orientation, direction and speed of motion, etc.—thereby allowing an object of interest to be identified even in the presence of other objects from which reflections arise and in the presence of background noise. The patterns typically span a plurality of transmit signals in each channel, thereby allowing the object's motion to be characterised over a time span that is longer than in prior-art tracking approaches that are based on calculating a succession of coordinates, or time-of-flight measurements, using reflections from respective individual transmit pulses. Indeed it is not even essential to identify definitively which part of the received signals relates to the reflections from the object. In other situations, the interference caused by echoic overlaps will be different between the channels, however, the general match between the set of reflections is not overly hampered by this difference. Instead, the reflections from other parts of the objects of interest (such as another finger or the back of a hand), having less of an interference problem, will tend to dominate in the matching process. This emphasises the robustness of the approach; even though there are differences in the patterns, an approximate matching is sufficient to differentiate between different motions, such as gestures.

Furthermore, the technique differs from prior art methods in that it does not have to extract a specific range measurement relating to a specific transmit signal; in other words, it can skip the time-of-flight or range estimation step, and use multiple reflections more directly. One reason why this can be important is that for instance ultrasonic systems are known to suffer from full-cycle errors in their range estimation process. Extracting a succession of time-of-flight measurements could result in the successive times-of-flight being representative of different modes of the reflection. This problem becomes even more serious when the orientation of the reflective object changes during its trajectory, in which case the modes may no longer be recognizable or representative of the same object part(s) as before. Hence, rather than relying on a single, potentially erroneous time-of-flight or range estimate, embodiments of the method of the invention may rely instead on the multiply observed and possibly superimposed echoes as they are, or with certain filters applied, rather than risking the extraction of a single range number which may be a poor estimator, and also vaguely defined, in the sense that it is not necessarily representative of any specific part of the object. One can say that extracting a single number from a complex data set is a risky operation if this number is used for critical purposes.

For example, if the invention is applied with pulse-mode transmission, the echo profile itself rather than the time-of-flight extract may be used for matching with information in the other channels. Multiple echoic taps from the same transmission, extracted at a receiver, can be used for matching with information at other receivers, possibly recorded from a different transmission. Traditional methods typically match the channels through a process of time-of-flight extraction and subsequent geometric computations rather than using the echo profiles in a more direct manner as is proposed herein.

Single-ranging systems, such as most infra-red rangers, typically extract a single range relating to a leading edge or an average distance to a complex and composite object like a human hand. This has, as argued above, the disadvantage of providing only a single number per timeslot. This information may be too little, or too erroneously sampled, to accurately determine motion patterns, particularly in the face of perspective changes during the motion trajectories. Thus, in some embodiments, the disclosed invention exploits multiple reflections rather than single ranges, i.e. it is based on multi-ranging or multi-reflective systems.

An advantage of the approach of pattern-matching across channels proposed herein is that, especially when the object of interest is in motion, it does not matter if there is interference between echoes from the object of interest and from another, possibly relatively-static object whose echoes have a similar time-of-flight distance from the system as echoes from the object of interest. In this situation the interference will tend to happen in a comparable manner across two channels, i.e. the same or approximately the same interfering overlap occurs in both channels, but the two channels will receive similar patterns arising from the object of interest during different time windows because the object is moving, so can distinguish the object of interest from the interference. In other words, one embodiment obviates the need to resolve strongly interfering echoic profiles resulting from two or more objects having similar times-of-flight which would normally be a very computationally expensive, if not impossible, task.

In some embodiments the method and software are used to control an electronic device which, to give some non-limiting examples, could be a computer, PDA, cell phone, display equipment, audio-visual equipment or sound reproduction equipment. The invention thus extends to an electronic device controlled by the methods and software disclosed herein. In some embodiments, the electronic device is a handheld device.

Received signals in one or more channels may be processed in any suitable manner to determine information for the comparison step; in particular, they may be amplified, sampled, filtered, have an envelope extracted, distorted in time, or transformed using any other appropriate transformation or transformations, which may be linear, non-linear, or complex, in the frequency domain, time-frequency-domain, or any other suitable domain.

The similar pattern could occur within a first time window in the first channel and within a second time window in the second channel. The temporal offset between the first and second time windows can be used to characterise the motion of the object. In various embodiments the temporal offset between the first and second time windows is greater than a minimum amount. The minimum can be defined in a number of ways. It can simply be defined as a length of time, e.g. more than 0.5 milliseconds (ms), or more than 1 ms or more than 1.5 ms. Alternatively it can be defined in terms of the time it takes a signal to travel to and be reflected from an object at the periphery of a predetermined detection range, such as less than 30 cm or less than 20 cm or less than 10 cm from a transmitter and/or receiver; or as the time it takes signal to travel just to the edge of the predetermined detection range—i.e. half the figures above. In some embodiments the temporal offset is equal to or greater than the maximum time-of-flight difference between two channels for a given signal—namely the time of flight corresponding to the distance between the receivers corresponding to the two channels or, where the channels share a receiver, the distance between the two transmitters corresponding to the two channels. Where the channels have independent transmitters and receivers the relevant distance for calculating the time-of-flight corresponding to the minimum offset is either the sum of the distances between the transmitters (transmitter separation) and the distances between the receivers (receiver separation), or the mean of the transmitter separation and the receiver separation.

Where the transmit signals are periodic (whether discrete or continuous), the predetermined minimum offset between the first and second time windows can correspond to the period of the transmit signals or a multiple of said period. It will be appreciated by those skilled in the art that the effect of the aforementioned features is that the patterns in the first and second channels arise from signals transmitted at different times (or different parts of a continuous signal). When viewed in terms of impulse response images (which are described in greater detail hereinbelow) the predetermined minimum offset is one or more time slots; two patterns would therefore be shifted in the time-slot-number axis relative to one another between the impulse response images corresponding to the two respective channels. Such a predetermined minimum offset has been found to give the best results in various implementations.

In accordance with various embodiments a time slot may be defined as a fixed length of time, the time of flight of a signal reflected by an object at the periphery of a predetermined detection range, or the period of a periodic transmit signal. Where the period is variable the time slot may be variable or may be defined as the mean, median, mode, maximum, minimum or any other function of the periods.

To appreciate certain features more clearly, it can be helpful to visualise the samples of a signal received over a particular channel in a time-slot as being entered into successive cells running down one column of a channel-matrix (optionally after additional processing such as calculation of an impulse response). Successive columns of the channel-matrix then correspond to successive time slots. Each time slot can abut the succeeding time slot. In some embodiments the time slots correspond to successive transmit signals, i.e. the length of the time slot corresponds to the period of the periodic transmission. Where the period is not fixed the time slots may correspond to the typical, average, maximum or minimum period. However time slots may alternatively or additionally be defined by reference to an operating range of the system, as set out above, or in another appropriate manner. The precise start points of each time slot may differ between the channels, but they may also be substantially the same duration in each channel. The values in the matrix may correspond to energy, amplitude, the envelope of amplitude, or any other appropriate quantification of the received signals. The matrix can be thought of as an image, with the values of the matrix corresponding to pixels of varying brightness levels in the image. Where these values represent impulse response taps the matrix can be considered as an impulse response image.

The language of successive transmit signals is adopted in the following explanations for ease of understanding; however, the disclosure should be understood as being equally applicable to the broader notions of time slots, as set out above, and should be read in the light of this.

When comparing the matrices for two channels, reflections from an object that are apparent in both channels may, in accordance with some embodiments, form a pattern that is offset horizontally, i.e. along the time-slot number axis, between the channels; it may also be vertically offset i.e. corresponding to further timing differences of less than the length of a time slot.

In some instances with some embodiments, the relative timing difference between the similar pattern in the channels may be several time slots. The similar pattern may span a plurality of time slots. In this case the first and second windows each comprise a plurality of time slots.

The above visualisation can be helpful for understanding some embodiments of the invention, but may also more directly correspond to the actual implementation of some embodiments of the invention. I.e. one or more arrays or matrices, or equivalent structures, may be constructed in a memory of an apparatus, and analysed for patterns arising from reflections from the object.

Advantageously, techniques familiar from the field of statistical analysis and image processing, such as line filters, pattern-matching algorithms, and image analysis e.g. Random Sample Consensus (RANSAC), may be applied to such an array or matrix in order to identify and/or analyse similar patterns.

Generally, the nature of the transmit signals can be selected as appropriate. In a simple embodiment they comprise a single impulse or spike, i.e. approximating a Dirac delta function within the limitations of the available bandwidth. This has some advantages in terms of requiring little, if any, processing of the 'raw signal' to calculate impulse responses (in the theoretical case of a pure impulse, no calculation is required), but it gives a poor signal-to-noise ratio because of the deliberately short transmission. In other embodiments the transmit signals are composed of a series or train of pulses, having a regular or irregular period. This gives a better signal-to-noise ratio than a single pulse without greatly increasing the computation required; a cross-correlation function can then be efficiently applied to the processed received signal due to the presence of many zero-multiplications, which can be excluded from any multiply-and-accumulate steps. In yet further embodiments the transmit signals comprise one or more chirps—i.e. a signal with rising or falling frequency. These give a good signal-to-noise ratio and are reasonable for calculating impulse responses using a corresponding de-chirp function applied to the 'raw' received signal. Calculating impulse responses (i.e. the theoretical response of the channel to a pure impulse) is advantageous in certain embodiments; however it is not essential to all embodiments of the invention.

In some embodiments, the raw received signals collected during first and second time windows in the respective first and second channels, or 'raw' impulse responses calculated therefrom, are compared, e.g. using a pattern matching method. In other embodiments, however, prior to any comparison step, the envelope or 'local energy' of the signals is calculated, and possibly smoothed in any suitable fashion, including smoothing within the time-windows and/or within individual time slots. Although the energy of the signal contains less information than the raw signal, using it in some implementations can provide better results than working with the 'raw' signals. This is due to a characteristic of ultrasound: at high frequencies, acoustic signals in the raw-signal domain oscillate rapidly between positive and negative values. While it might theoretically be possible to identify a similar pattern between the channels among these high-frequency oscillations, in practice the speed of the oscillations makes this difficult. Part of the reason for this is that any reflective objects may present slightly different reflections from the different perspectives of the different channels. The consequence of this change in terms of the potential for a 'raw signal match' can be quite dramatic, leading to very low correlation values. The energy or envelope however, is far more robust to these effects, and can be seen as a low-resolution, positive-values-only variation of the original signal which will vary less with the underlying changes in received signals resulting from perspective differences.

The step of comparing information relating to signals received over the first channel with information relating to signals received over the second channel can comprise comparing information relating to received signals arising from a plurality of successive transmit signals on the first channel with information relating to received signals arising from a plurality of successive transmit signals on the second channel. Where the transmit signal is continuous, the successive transmit signals may arise from periodic features inherent in the signal e.g. where a transmit signal comprises alternating rising and falling chirps having a regular or irregular period between successive rising chirps. Where the transmit signal does not have a well-defined period it may be arbitrarily divided into time slots.

Throughout this specification, an average may be a mean, a median, a mode, or any other suitable statistical measure.

In accordance with some embodiments, at least some of the transmit signals from which the similar pattern in one channel arises will have been transmitted earlier than the transmit signals from which the similar pattern in the other channel arises. Such relative timing differences would typically indicate a difference in the time-of-flight distances to the object for each channel of more than one time slot (e.g. the typical or average or minimum duration between each of the successive transmit signals), at least at some point in time within the time window over which the transmit signals are transmitted, although the invention is not necessarily strictly limited to this—the difference in time-of flight distances could be more than half a timeslot, or at least 75%, 90% or 95% of a time slot. Where a gesture has been made, such as a wave of a hand past the receivers of both channels, these relative timing differences—i.e. where the similar pattern in one channel appears with a substantial delay (possibly several time slots) in the other channel—may correspond to a movement past a receiver of one channel and then past a receiver of the other channel, such that each channel receives substantially the same pattern of reflections from the hand, but with a time delay corresponding to the direction and speed at which the gesture is made.

It will be appreciated that, in this way, the motion of the object may be characterised sufficiently for a device to recognise and respond to a gesture without needing to determine a series of precise position estimates; rather the time offset of the pattern between the channels may give sufficient information to enable a gesture-based user interaction to occur. More generally, the use of the time duration measurements for tracking and gesture recognition reduces the need for high spatial resolution. In one sense, this can be seen as trading "time for space", enabling reliable estimation where a high spatial resolution is hard to obtain. The value of this increases when reducing the system bandwidth, i.e. when using a narrowband system as opposed to a broadband system. Narrowband systems have lower resolution, but are often less costly and more power-efficient than broadband systems. In some implementations, at least one analogue or digital filter is applied to the received signals on one or the channels and the comparison step is carried out on at least a portion of a filtered signal.

Although the disclosure has so far been presented in relation to two channels, it will be readily appreciated that more than two channels may be used. Additional channels may allow for greater precision in characterising the motion of the object and/or greater robustness to noise and interference. Each channel may have its own dedicated transmitter(s) and receiver(s), but advantageously at least one transmitter is shared by a plurality of channels. When multiple transmitters are used simultaneously, the transmit signal may be encoded differently for each transmitter. This enables the signals arising from transmission by any of the transmitter to be separated out at the receiving side by matching or de-correlating with the transmit code. This encoding may be in time, frequency, phase, or using any other suitable technique. Sharing transducers can provide cost and space savings in manufacture. Additionally or alternatively, one or more receivers may be shared between channels.

Although mention so far has been made of a single object of interest, or target object, the invention may, of course, be used to characterise the motion of a plurality of objects.

Any appropriate definition or measure of similarly of the patterns across the channels may be employed. In some embodiments, a variance parameter (e.g. least squares) between two sets of values arising from reflections from the object is calculated, and a threshold variance is applied to determine whether two patterns from different channels are similar or not. In order to allow for relative timing differences between the channels, a cross-correlation may be performed between sets of values arising from reflections from the object. The cross-correlation may allow for shifts in timings within the duration of reflections from any particular transmit signal and/or between the reflections from successive transmit signals (i.e. in the vertical and/or horizontal directions in the visual interpretation described above).

The similar pattern in one channel may be substantially the same as the similar pattern in the other channel, but equally it may be a transformation it. Such a transformation might be a stretch or compression in one or two dimensions, a stretch a skew, an inversion in time of the received signal, an inversion in the ordering of the time slots, or any other appropriate transformation. When attempting to identify a similar pattern, a transformation or inverse transformation may first be applied to information relating to signals received within all or part of the time slots in one or both channels before an identification is made.

The transformation necessary to achieve a match may give additional information which is useful for characterising the object's motion in addition to the relative timing of the similar pattern across the channels.

The step of identifying a similar pattern may result in a reference to the similar pattern in one or both channels being recorded in a memory, or communicated over a medium; however, it may result only in an internal change of state of the processing means.

Where reference is made herein to impulse responses and impulse response images, these terms are to be understood to include simple linear transformations of the received or calculated impulse responses, or more complex transformations such as offset, negated or linearly scaled transformations thereof, and envelopes of the impulse response, which could correspond to the energy levels in the impulse response. The terms impulse response and impulse response image in the following should therefore be construed to encompass all such equivalents. More generally, the term response image will be used to mean any array of sampled and optionally processed responses, especially when suitable for analysis using image-processing type techniques.

Some disclosed embodiments compare information relating to received signals between channels to identify similar patterns. Although in some embodiments this is used for detailed tracking, such as would be required to control a cursor on a screen, in other embodiments, characterising the motion of the object is applied to the problem of gesture-based input. Unlike detailed tracking, where an input object (e.g. a user's finger) is required to move within a relatively constrained input region, and where there is typically a predetermined linear relationship between the distance moved by an input object and the distance moved by a cursor on a screen, with a gesture this is not the case; rather, there may be considerable tolerance to variations in the scale and precise location of the gesture (which may, for example, be a clockwise circling motion of the user's hand in the approximate vicinity of the screen of a handheld device).

The prior art approaches cannot cope adequately when two objects are at similar time-of-flight distances as each other from a transmitter-receiver pairing, even if the objects are not close to each other in space. The embodiments disclosed herein have an advantage over the error-prone, state-of-the-art, pair-wise comparison of echoes or impulse responses, by instead considering several echoic responses together and by comparing information relating to received signals across multiple channels.

Noise (e.g. from overhead fluorescent lighting) or interference (e.g. due to echoes off a wall) may present substantially the same contribution in both channels, or may present different contributions. In general, noise is likely to be similar in both channels, while interference due to reflections off object other than the object of interest may be less similar. However in either case, the pattern-matching approach described herein can be robust in the presence of unwanted signals. For example, where the pattern of interference over time in each channel is different between the channels, this may not be detected as contributing to a similar pattern between the channels. Where noise is of a relatively low intensity or limited to only some of the reflections compared with the reflections from the object of interest, it might be ignored in the step of identifying a similar pattern.

In some embodiments, the transmit signals are dithered in time, with an inverse dithering applied to the received signals, so as to dither the positions of echoes from distant objects (i.e. those at a time-of-flight distance spanning multiple time slots) in the response image for each channel, while leaving the reflections from the object of interest substantially unaffected. If the dither applied to each channel is different, perhaps in a pseudo-random fashion, the 'blurred' echoes from any distant objects will no longer correlate between the channels, so will not interfere with the identification of a similar pattern between the channels. A similar result may be achieved by coding the transmit signals differently for each channel (e.g. on different frequencies or transmit codes), so that interference arising from distant reflections will be different on each channel and therefore should not confuse a pattern matching algorithm.

In some embodiments the patterns comprise intensity contours in response images. Clearly the fine structure of such contours will be dependent on the nature of the transmit signal; and they might not be static as interference between overlapping lines might give rise to flicker. However the contours can be approximated by lines. Such lines could be straight or curved and in some embodiments the lines themselves are approximated by a plurality of line segments. Typically, stationary objects are represented as horizontal lines in the response image, while moving objects will be represented by non-horizontal lines. Movements that extend or shorten at a constant rate the time-of-flight from the transmitter to an object and back to the receiver will be represented as straight lines at an angle to the horizontal, whereas other motion will be represented by curves.

At least one filter that passes signals corresponding to a set of trajectories of motion of the object can be applied to the signals received on at least one channel.

In some embodiments, a 'horizontal' filter is applied to a response image to remove values arising from reflections from a stationary or nearly-stationary object. This may be used to filter out reflections from nearly-stationary background objects, but allowing reflections from the moving object of interest to remain. More generally, such a horizontal filter corresponds to filtering out values corresponding to signals that remain fixed at the same time-offset after transmission of each successive transmit signal.

Other filters than the horizontal filter could be applied, additionally or alternatively, such as members of a two-dimensional mask line filter bank, in order to remove the contribution of objects which are largely, but not necessarily completely static. One example would be to use an alpha-blender with a very high forgetting factor.

The parts of the response images which are retained or thrown away can be represented by isolating the selected image parts themselves, or parts of a corresponding filtered image, such as when applying an edge filter, a line filter or a threshold. Alternatively they can comprise information extracted from the image, such as a line segment extracted from the intensities of the response image or variants thereof, a blob, a probabilistic representation such as a set of particles or a probability distribution.

In some embodiments a Constant False Alarm Rate (CFAR) filter may be applied to raw or processed signals from one or more channels.

Parts of a response image may also need removal due to other factors, such as noise. In particular, this can occur in many real-life situations, for example, due to metallic noise such as those generated by a jangling bunch of keys, or by sensor saturations.

The filters could be designed to remove contributions from slowly-moving or still objects, and/or contributions where it can be determined that two objects are overlapping in time-of-flight distance.

Filters such as line filters may be used additionally or instead to enhance a motion trend in the received signals and/or to detect motion of the object in the presence of noise. The use of such filters can make tracking of an object, including tracking by time-of-flight ellipsoid intersection techniques, easier and more reliable. For example, if an echo from a finger to be tracked is relatively strong and the echo from other interfering fingers are relatively weak, then, applying a set of edge filters to the response image for a particular channel can significantly reduce the contribution of the interfering fingers, since the signals passed by the filter are dominated by the finger to be tracked. After determining similar patterns, if detailed positional analysis is required, a 'leading edge' in the response image (i.e. the output of an edge-detection algorithm that finds the left-most edges of a set of reflections in the image) can be determined and combined with time-of-flight ellipsoid intersection to determine the position of the object. In general, however, it is envisaged that methods in some embodiments will not comprise a time-of-flight intersection calculation step, but rather will allow a gesture or movement of the object to be inferred directly from the signals on one or more channels. In some embodiments, the apparatus may be configured as to have two modes of operation: a gesture-determining mode, which operates by a method of the present invention and which does not perform any ellipsoid-intersection calculations; and a detailed tracking mode, which does calculate positional information, either using a method described herein, or by any other appropriate method.

In some embodiments information relating to only a portion of the received signals on each channel is used for the comparison step. In particular, portions of the received signals that do not include reflections from the object of interest at all, or to a substantial degree, may be excluded from the comparison. The portions selected for the comparison need not necessarily correspond to the same time divisions on each channel. In one set of embodiments matching is carried out on only a portion of the signals received in a given time slot. A single time slot could be used, but a plurality of time slots can also be used. The same portion of each time slot can be used or different portions of the respective time slots could be used.

In a further aspect, the invention provides a method of characterising the motion of an object comprising:
  continuously or discretely transmitting acoustic transmit signals over first and second channels, each channel comprising at least one transmitter and at least one receiver, wherein the received signals on each channel comprise reflections from the object;
  dividing the signals received on the first channel into a succession of first time slots and dividing the signals received on the second channel into a succession of second time slots;
  comparing information relating to reflections from the object in a first match region comprising a portion of one or more of said first time slots with information relating to signals containing reflections from the object in a second match region comprising a portion of one or more of said second time slots;
  identifying a similar pattern in both match regions; and
  using one or more relative timing differences between the match regions, to characterise the motion of the object.

This aspect extends to apparatus for characterising the motion of an object comprising:
  means for continuously or discretely transmitting acoustic transmit signals over first and second channels, each channel comprising at least one transmitter and at least one receiver, wherein the received signals on each channel comprise reflections from the object;

means for dividing the signals received on the first channel into a succession of first time slots and dividing the signals received on the second channel into a succession of second time slots;

means for comparing information relating to reflections from the object in a first match region comprising a portion of one or more of said first time slots with information relating to signals containing reflections from the object in a second match region comprising a portion of one or more of said second time slots;

means for identifying a similar pattern in both match regions; and means for using one or more relative timing differences between the match regions, to characterise the motion of the object.

In some embodiments, a computer software product is disclosed, and to a carrier bearing the same, configured, when run on a computer, to characterise the motion of an object comprising:

instructions for continuously or discretely transmitting acoustic transmit signals over first and second channels, each channel comprising at least one transmitter and at least one receiver, wherein the received signals on each channel comprise reflections from the object;

logic dividing the signals received on the first channel into a succession of first time slots and dividing the signals received on the second channel into a succession of second time slots;

logic for comparing information relating to reflections from the object in a first match region comprising a portion of one or more of said first time slots with information relating to signals containing reflections from the object in a second match region comprising a portion of one or more of said second time slots;

logic for identifying a similar pattern in both match regions; and logic adapted to use one or more relative timing differences between the match regions, to characterise the motion of the object.

Thus it may be seen that in accordance with this aspect, pattern matching is carried out between respective match regions in the channels. The match regions can relate to only part of each time slot. While each time slot may contain relatively faint echoes from a preceding transmit signal, typically it principally contains echoes arising from a single transmit signal. The match region can therefore be chosen such that it includes the primary echoes of the transmit signal from the object, but largely excludes leftover echoes from previous transmit signals. In this way, interference from reflections not arising from the object of interest can be avoided by 'focussing in' on the signals of interest. It can also simplify and improve the accuracy of the process of identifying a similar pattern in both channels, and of determining relative timings, by reducing the size of the search space within the received signals.

As in the previous embodiments, the time slot can simply be an arbitrary fixed or variable time, a time-of-flight for signals reflected from the edge of a predetermined detection zone or the period of a periodic transmit signal (including the typical, average, maximum or minimum period where it is not fixed).

In the simplest embodiments the match regions comprise a plurality of time slots and the same portion of each time slot. If the received signals are considered as an image (i.e. consecutive time slots stacked adjacent to one another) the match regions would then comprise rectangles on the image. However it is not essential for the same portion of each time slot to be used, nor for the time slots to be consecutive. So the match region need not be rectangular and could comprise a plurality of separated sub-regions. The latter could be useful particularly where it was required to characterise the motion of multiple objects (whether objects of interest or sources of noise). Also, some of the time-slots in the successions of time-slots can also be kept out of the matching processes in order to save clock cycles, or for other reasons, such as their contamination by noise.

The comparison between the match regions in the respective channels could take many different forms. The similar pattern in each channel may be determined by any appropriate similarity metric applied in respect of information relating to all or some of the match regions. For each channel, information relating to at least two time slots can be used in the comparison.

The similar pattern in one channel may be substantially the same as the similar pattern in the other channel, but equally it may be a transformation of it. Such a transformation might be a stretch or compression in one or two dimensions, a stretch, a skew, an inversion in time of the received signal over all of part of the match region, an inversion in the ordering of the time slots within the match region, or any other appropriate transformation. When attempting to identify a similar pattern, a transformation or inverse transformation may first be applied to information relating to signals received within all or part of the time slots in one or both channels before an identification is made.

The transformation necessary to achieve a match may give additional information which is useful for characterising the object's motion in addition to the relative timing of the matched regions across the channels.

Where the match regions comprise a plurality of sub regions, they may be compared individually across the channels in order to determine similar patterns within each sub-region. The results from each of these sub-region comparisons can be combined so that, in effect, a composite match region in one channel is compared with a composite match region in the other channel. In these embodiments, the temporal relationship between the sub-regions within a channel may be required to remain constant in order for a multi-sub-region similar pattern to be identified across two or more channels; however, preferably, the relative timing between the sub-regions within a channel is allowed to vary, possibly within predetermined limits, and a multi-sub-region similar pattern still be identified. In this latter case, the inter-sub-region timings within a channel and between channels may be used to further characterise the motion of the object.

In accordance with this aspect it has been found that effective motion characterisation can be achieved with timing differences between the matching regions which are less than a time slot length. In the language of impulse response images this means that purely vertical shifts can be applied to a match region to match it to the match region on the other channel. It will be recalled that in accordance with the first aspect of the invention a timing difference greater than (e.g. a multiple of) the time slot length was disclosed, which translates to a shift at least partially in the horizontal direction.

Thus characterising the motion of the object from relative timing differences between the channels, associated with the similar pattern, may comprise determining that a match region containing a similar pattern in one channel occurs earlier within each transmit-signal response (a vertical shift) and/or relates to earlier transmit signals (a horizontal shift) in another channel. This may be used to infer motion of the object. For example, an embodiment may be arranged to identify a motion as belonging to a set of predetermined gesture types, where a circling motion carried out on the left side of the device might correspond to a wave pattern (e.g. a sine wave) in the response image of both channels, having a particular range of vertical and horizontal offsets between the match regions in each channel. Testing for a 'match' between the waves in each channel may comprises matching a single unitary match region in each channel, but will typically involve matching a region comprising a set of sub-regions, having a particular distribution in each channel. It may involve a matching step defined in part by a hypothesised location of the gesture in space, but may be made on a trial-and-error basis, much as is done in video image compression algorithms, which look for similar patterns between video frames.

In some embodiments, weightings may be assigned to some or all of a plurality of sub-regions (which need not be separate) in a channel, to give differential importance to the different sub-regions in a comparison algorithm.

The match regions may be determined after an initial analysis of the received signals to identify particular parts of the signal. These parts might be those having high energy levels or a pattern. This initial analysis is preferably conducted for each channel without reference to the signals received on the other channels. A pattern here might be self-similarity of the received signal over a number of transmit periods, or a relatively high degree of matching with a line, edge or other filter in the response image.

In all aspects, the comparison of signals may be performed continuously (i.e. one time slot at a time, albeit also making use of signals arising from preceding time slots) or batch-wise (i.e. only once per plurality of transmit signal periods). In either case, there is a finite time window, of predetermined or flexible duration, of receive signals for each channel which are used in any given comparison operation. In some embodiments of the present aspect, this time window corresponds to the 'width' of the match region in the response image.

The method can comprise determining a portion of the signals received over a sampling period on one channel, or information relating thereto, as containing, or being relatively more likely than another portion to contain, reflections from the object of interest. The match region for the channel can then span that portion of the received signals. The sampling period over which the determination is made may be substantially longer than the time window over which the comparison is performed; e.g. two, three, four or more times longer. The sampling period may be related to the size of a memory buffer allocated to the process. It may be analysed continuously (e.g. as sliding sampling period) or batch-wise in order to determine said portion of the signals.

In some embodiments, the match region comprises less than half of each time slot over the duration of the time window. This can lead to particularly improved performance gains over searching the full-height image for similar patterns.

In some embodiments, an efficiency saving can be made by not computing impulse responses for transmit signals that do not contribute to the received signals in the match region. At any point, it may be possible to make an assumption that only a certain number of columns within the impulse response image will be important during the next few time frames, based on an assumption about the movement of the object of interest (such as its direction of movement being constant from a time). Being able to compute, say, only 20% of the columns of the impulse response image can, in some situations, reduce the overall processing costs to 20% compared with the original cycle budget; or even less, if memory and cache issues are cost-driving effects. This can provide a significant power saving, which may be particularly advantageous in a battery-powered device.

The above techniques find application in many areas. However the Applicant has realised that in particular they provide a possible solution to a problem it has identified in the context of an acoustic interface for a handheld device. What the Applicant has realised is that characterising the motion of a finger, group of fingers, hand or other object touching or in the vicinity of the screen of a portable device, or spaced some distance away from the device, is made particularly difficult by the interference of reflections from a user's holding hand. For example, when a device such as a mobile phone, PDA, games console, bar-code reader, satellite navigation unit, etc. is held by lying or being gripped in the palm of the user's holding hand, with the thumb and fingers curled around one or more edge faces to stabilise the device, it is often the case that one or more parts of the thumb or fingers will intrude into the space in which input motions may be detected. This is particularly likely in the context of an acoustic (e.g. ultrasound) input system as sound waves disperse more readily than light, so cannot so easily be confined to a restricted input zone; rather, if acoustic transmitters and receivers are mounted on a surface of the device, they are likely to transmit and receive sound substantially hemispherically. Moreover, unlike the casing of the device, the location and motion of gripping fingers relative to any transducers is not fixed. For any individual receiver, it may not be straightforward or desirable to determine the direction from which sound is received.

From a further aspect, a method of operating a handheld device held in a user's holding hand, through movement of an input object, can comprise:

transmitting acoustic signals from at least one transmitter to at least one receiver, wherein the received signals at the receiver comprise reflections from the object;

using the transmitted and/or received signals to distinguish between reflections from the holding hand and reflections from the object;

using the reflections from the object to characterise its movement; and controlling an operation of the device on the basis of said movement.

Various embodiments can include a handheld device capable of being operated by movement of an input object, the device comprising: at least one receiver and at least one transmitter configured to transmit acoustic signals for reception by the receiver after reflection from the object; processing means arranged to use the transmitted and/or received signals to distinguish between reflections from a hand holding the device and reflections from the object and to use the reflections from the object to characterise its movement; wherein an operation of the device can be controlled on the basis of said movement.

In some embodiments, a computer software product is disclosed, and to a carrier bearing the same, configured, when run on processing means on a handheld device to allow operation of the device through movement of an object, the software comprising: instructions for transmitting acoustic signals from at least one transmitter to at least one receiver, wherein the received signals at the receiver comprise reflections from the object; logic using the transmitted and/or received signals to distinguish between reflections from the holding hand and reflections from the object; logic using the reflections from the object to characterise its movement; and logic for controlling an operation of the device on the basis of said movement.

Thus in accordance with this aspect, the transmitted and/or received signals are used to distinguish between the object (such as a pointing finger) which is intended to operate the device and unwanted reflections from the gripping fingers of the other hand. The techniques previously described, whereby similar patterns in two respective channels are matched to one another, can be used to achieve this, but are not essential. For example the Applicant has devised a further technique for achieving this whereby only some channels are used to characterise movement of the object and so in a further set of preferred embodiments the aforementioned method of operating a handheld device comprises:

transmitting acoustic transmit signals over first and second channels, each channel comprising at least one transmitter and at least one receiver, wherein the received signals on each channel comprise reflections from the object;
selecting a subset of the channels, on the basis of the amount of interference experienced by the channels; and
using received signals from only said subset of channels in order to distinguish between reflections from the holding hand and reflections from the object.

In a further aspect, a method of receiving user input to a handheld device held in a user's hand, through movement of an input object, can comprise:

continuously or discretely transmitting acoustic transmit signals over a plurality of channels, each channel comprising at least one transmitter and at least one receiver, wherein the received signals on each channel comprise reflections from the object;
selecting a subset of the channels, on the basis of the amount of interference experienced by the channels from reflections from a part of the user's holding hand;
using received signals from only the subset of channels in order to characterise a movement of the input object; and
determining a user input from the characterised movement.

In some embodiments, a handheld device can comprise: a plurality of channels, each channel comprising at least one transmitter and at least one receiver, means for continuously or discretely transmitting acoustic transmit signals over said channels wherein the received signals on each channel comprise reflections from an input object; means for selecting a subset of the channels, on the basis of the amount of interference experienced by the channels from reflections from a part of a user's holding hand; means for using received signals from only the subset of channels in order to characterise a movement of the input object; and means for determining a user input from the characterised movement.

In other embodiments, a computer software product is disclosed, and to a carrier bearing the same, configured, when run on processing means on a handheld device to allow operation of the device through movement of an object, the software comprising: instructions for continuously or discretely transmitting acoustic transmit signals over a plurality of channels, each channel comprising at least one transmitter and at least one receiver, wherein the received signals on each channel comprise reflections from the object; logic for selecting a subset of the channels, on the basis of the amount of interference experienced by the channels from reflections from a part of the user's holding hand; logic for using received signals from only the subset of channels in order to characterise a movement of the input object; and logic for determining a user input from the characterised movement.

Thus, where the number of channels provided for input determination is greater than the minimum needed, those channels that are too affected by interference between reflections from the object and from the gripping fingers, may simply be ignored. Such interference does not necessarily arise from masking along a direct line-of-sight, as in an optical system employing a lens, but may occur whenever two objects are at approximately the same time-of-flight distance as each other within a channel, even though they may be considerably spaced apart. Such interference is particularly problematic in the context of a reflection-based approach, such as in some embodiments; in arrangements where an active acoustic transmitter is being tracked, only direct line-of-sight clearance is needed, as in the optical case.

In accordance with the embodiments set out above it should be understood that using the selected subset of channels for characterising a movement does not necessarily require the complete absence of data from the non-selected channels in subsequent calculations and the invention should therefore be understood to cover the situation where some data is used from these channels but either the quantity of this data or the weighting applied to it is such that it has no material impact on the outcome of the calculations.

The received signals used for the analysis may be the same as, or overlapping with, the received signals used to characterise the movement, or they may be different; e.g. earlier in time.

The selection of the subset of channels may comprise comparing received signals on one channel with those on another to determine a channel for which there is less interference or a lower chance of interference from reflections from the user's holding hand than there is for at least one other channel. Alternatively or additionally the selection may comprise determining whether the signals received on a channel meet a predetermined criterion for inclusion in the subset. This criterion could be related to whether the system is able to distinguish reflections from the input object from reflections from another object, such as the user's holding hand. It may take the form of a threshold applied to a measure of the system's confidence in being able to make such a distinction.

In some embodiments, a channel is selected that has a clear 'front' in its received signals; i.e. a leading edge, separated from other, trailing echoes. This may be tested for in a leading-edge testing step, such as applying an edge filter.

In some embodiments, a channel is selected that exhibits a high degree (when compared with the other channels or with a threshold) of uniformity between echoes from successive transmit signals (albeit potentially allowing for a progressive time-shift due to motion of the object).

This concept of uniformity, or self-consistency, can be understood as follows. Assume that information relating to a series of echoes, recorded successively, is arranged in a matrix. With reference to impulse response images, this could constitute a 'block' in the image; for example, a part of the image where a finger trace is believed to be located. If the echoes are highly self-consistent, the successive columns within that block will be more or less equal to one another, perhaps with the exception of a gradual upwards or downwards shift, as a consequence of the movement of the object. If the matrix and its columns is $X=[x_1, x_2, \ldots x_p]$, then if the columns $x_1, x_2, \ldots x_p$ are merely shifted variants of one another, they will typically have the same frequency amplitude spectrum. Let $X_i(\bar{\omega})=F(x_i)$ where $F(.)$ denotes the Discrete Fourier Transform (DFT). Then, $|X_i(\bar{\omega})|$ is the amplitude for the frequency $\bar{\omega}$, and a set of frequency amplitude values $a_{ji}=|X_i(\bar{\omega}_j)|$ can be defined for frequencies $\bar{\omega}_1, \bar{\omega}_2, \ldots \bar{\omega}_n$ of interest. These values can further be arranged into a matrix $A=\{a_{ji}\}$ where the element in the j'th row and the i'th column contains the amplitude of the i'th set of echoes, i.e. it is representative of the i'th column in X, at the j'th frequency of interest. What remains to be tested is whether the columns of A are all substantially the same. There are several ways to do this, but a simple and straightforward way is to normalize the columns of A to have unit variance, i.e. norm equal to 1, and subsequently compute the first Eigenvalue of the matrix $AA^T$. If this value is above some threshold $\gamma$ this indicates that the columns are equal, i.e. the vectors are parallel, and hence, that the trace of the object is self-consistent.

Other approaches involve comparing the columns in A more directly. For example, let $d_{st}=\|a_s-a_t\|_2^2$ where $a_r$ is the r'th column of A. If the sum of the elements $\{d_{st}\}$ for s=1, . . . p and t=1, . . . n exceeds a threshold, or if one of its member does, or if a percentile does, or if its variance is large, this can be taken as a lack of self-consistency. Of course, more direct approaches could be taken by working with the original matrix X while compensating for the shifts in the columns resulting from the motion.

In some embodiments, there is a predetermined minimum value and/or maximum value and/or target average value over time and/or fixed value for the number of channels in the subset. The channel selection may then be influenced by these predetermined amounts; for example, if the subset size is fixed at four channels, then the four channels having least interference are selected.

In some embodiments, one or all of the transmitters that are not used in the selected subset do not transmit; i.e. they are temporarily disabled, since they are not contributing to the obtaining of 'useful' information. This can provide a considerably power saving, which is especially advantageous in battery-powered devices. It can also reduce noise or interference on the selected channels, resulting in better motion characterisation.

In some circumstances, there may not, for a time at least, be sufficiently many channels sufficiently free of interference as to be able to characterise the object's motion reliably. This may occur when, for example, too many objects are 'overlapping' in a time-of-flight sense. If the received signals for a channel are determined not be suitable for motion characterisation, that channel may, for a time, be indicated to the system as being unusable. This can prevent further steps in the motion-characterisation process from being carried out where the results would be unreliable. This also reduces energy consumption. Such an approach can be particularly useful if the system is configured to recognise a set of gestures, such as an up motion, a down motion, a left motion and a right motion. Even if all or above a threshold number of channels are indicated an unusable for a time, data relating to motion before and/or after that time may nonetheless be sufficient to classify the motion correctly, whereas attempting to include the 'unusable' data could lead to an erroneous classification.

The analysis may comprise determining the likelihood of an overlap in the echoes from the input object and another object occurring in future for a particular channel based on signals already received.

The selection of a subset may be conducted just once during any user input session; however a review of the current selection and/or a new selection step can be conducted at intervals. The intervals may be regular or irregular. The review or the new selection step may be prompted by a timer or may be in response to the received signals over the current subset and/or the non-selected channels.

While mention has been made above of tracking a finger, it is to be understood that the invention is applicable also to determining a gesture—e.g. a sweep of a hand from left to right past the front face of the handheld device—where precise tracking (such as a succession of accurate 3D coordinates) may not be necessary or desirable.

These aspects may be used independently or combined with one or more of the other aspects described herein to provide enhanced performance.

The Applicant has also devised a yet further way of distinguishing between reflections from the holding hand and reflections from the object. In a set of embodiments the method of operating the hand-held device comprises receiving signals reflected from at least two reflecting surfaces to produce reflected signals;

processing the reflected signals received over a period of time so as to determine an attribute of the first surface and an attribute of the second surface during said time period;

using said attributes to process subsequently received signals so as to distinguish signals reflected off one of the surfaces from signals reflected off the other surface; and using the signals reflected off at least one of the surfaces to characterise its motion.

In another embodiment, a method of receiving user input to a handheld device held in a user's holding hand, through movement of an input object, can comprise:

continuously or repeatedly transmitting acoustic signals between a first transmitter-receiver pair and between a second transmitter-receiver pair, the signals being reflected from a first reflecting surface on an object of interest or a second reflecting surface on said user's holding hand to produce reflected signals;

processing the reflected signals received over a period of time so as to determine an attribute of the first surface and an attribute of the second surface during said time period;

using said attributes to process subsequently received signals so as to distinguish signals reflected off one of the surfaces from signals reflected off the other surface;

using the signals reflected off the first surface to characterise its motion; and determining a user input to the device from the characterised movement.

In some embodiments, a handheld device can comprise: a first transmitter-receiver pair and a second transmitter-receiver pair, means for continuously or discretely transmitting acoustic signals between the first transmitter-receiver pair and between the second transmitter-receiver pair, the signals being reflected from a first reflecting surface on an object of interest or a second reflecting surface on said user's holding hand to produce reflected signals; means for processing the reflected signals received over a period of time so as to determine an attribute of the first surface and an attribute of the second surface during said time period; means for using said attributes to process subsequently received signals so as to distinguish signals reflected off one of the surfaces from signals reflected off the other surface; means for using the signals reflected off the first surface to characterise its motion; and means for determining a user input to the device from the characterised movement.

In various embodiments, a computer software product is disclosed, and to a carrier bearing the same, configured, when run on processing means on a handheld device to allow operation of the device through movement of an object, the software comprising: instructions for continuously or repeatedly transmitting acoustic signals between a first transmitter-receiver pair and between a second transmitter-receiver pair, the signals being reflected from a first reflecting surface on an object of interest or a second reflecting surface on said user's holding hand to produce reflected signals; logic for processing the reflected signals received over a period of time so as to determine an attribute of the first surface and an attribute of the second surface during said time period; logic using said attributes to process subsequently received signals so as to distinguish signals reflected off one of the surfaces from signals reflected off the other surface; logic using the signals reflected off the first surface to characterise its motion; and logic for determining a user input to the device from the characterised movement.

In accordance with the aforementioned aspect, effectively a model of each surface is formulated at a first point in time, and an assumption regarding the continuity of this model over time is then employed to distinguish one surface from the other in signals received after that point in time. In particular, this approach can allow the surfaces to be distinguished within received signals in which their reflections overlap in time and would otherwise be difficult or impossible to interpret.

Preferably the attributes are selected from the group consisting of: speed; velocity; direction of movement; shape; size; reflectivity; time-of-flight proximity; location; signal self-similarity; and the rate of change, or any other function, of the aforementioned.

The reflecting surfaces may connect to other surfaces which may or may not also contribute reflections to the received signals. Echoes may also arise as a result of secondary echoes, i.e. sound travelling via a first and second reflector to the receiver, effectively creating a 'ghost echo'.

In some embodiments, the object of interest is a finger of a user's hand and the other object is a part of the user's other hand.

In embodiments that also embody the channel-selection method set out above, the two approaches may be used synergistically by using the present attributes to predict which channel or channels are likely to experience less interference, and selecting those channels. For example, a time-of-flight overlap might be foreseen for a channel based on the present modelling approach, and this information could be used to prefer other channels over that one for an appropriate future time period during which the overlap is expected to occur.

In practice, this could be accomplished by, first, examining a 'block' in the response image for self-consistency, as explained above. If the block is found to be 'self-consistent' within an acceptable bound, the block is extended slightly so that it is representative of reflective objects both further away and closer up than it previously was. Then the self-consistency test is applied again. If the enlarged block passes the test, it means that no other, close-by objects are close-enough to cause a problem. If it fails, this will be a result of more echoes being in the enlarged block at different ranges. The channel for which this holds true could then be excluded. In the frequency domain, multiple echoic sources, even if separated, will typically cause fluctuations in the amplitude spectrum. This is a result of the frequency spectrum being an integral computed over all the echoes under consideration.

As explained previously, all the above aspects can assist in characterising motion of an input object in the presence of interfering reflections from an object other than the input object. They may be used particularly to address the problem, introduced above, of interference in acoustic input caused by digits that are gripping a handheld or palmtop device.

Any of the definitions and features, optional or otherwise, described herein in the context of one aspect may, where appropriate, be applied to any of the other aspects also.

In all of the methods herein, the results may be stored in a volatile or non-volatile memory. Additionally or alternatively they are displayed on a display device. They could comprise the step of providing a display signal for a display device. Additionally or alternatively the methods are used to control a device. They thus could comprise the step of providing a control signal for an said device.

The methods disclosed herein can be carried out using computing means, computing machines, data processing apparatus or any other device capable of carrying out stored instructions. Such a device may be static; although the invention can equally be used with mobile devices. Indeed the advantages achievable in accordance with at least some embodiments of intolerance to absolute orientation or position and the ability to separate different motions make it particularly suitable for use in mobile devices. When viewed from another aspect therefore the invention provides a mobile device comprising an ultrasonic transmitter and separate/integrated ultrasonic receiver, said device being configured so that at least one operation thereof is controlled by determination of the movement of a user's hand in accordance with any of the methods set out hereinabove.

Whilst reference is made herein to arrangements in which signals are transmitted, reflected by an object and then received, the principles apply equally to 'active objects' i.e. where the object being detected or tracked itself includes a transmitter so that the signal originates from the object rather than being reflected by it.

In all aspects the signals can be ultrasonic signals. This means acoustic signals having a frequency higher than the normal human hearing range; typically this means the signals have a frequency, or base or median frequency greater than about 20 kHz, e.g. between about 30 and about 50 kHz. In a set of embodiments the signals are produced by and/or received by transducers which are also capable of (and preferably used for) transmission and reception of audible sound. For example in a mobile device such as a mobile telephone the preferred embodiments of the invention use the same transducers as are used for speech.

Although several aspects of the invention have been defined and described in terms of acoustic signals the Applicant has appreciated that many of the principles and arrangements described would also be applicable to non-acoustic signals, particularly radar signals, i.e. electromagnetic waves having a frequency of between about 3 GHz and 11 GHz. The embodiments disclosed herein thus extend to use of non-acoustic signals instead of acoustic signals with corresponding alteration to the statements set out herein. Clearly the exemplary times-of-flight and other figures would also be altered where non-acoustic signals are employed by reason of the differing speed of propagation.

DETAILED DESCRIPTION

Certain embodiments of the invention will now be described, by way of example only, with reference to the accompanying drawings.

Figure 1:
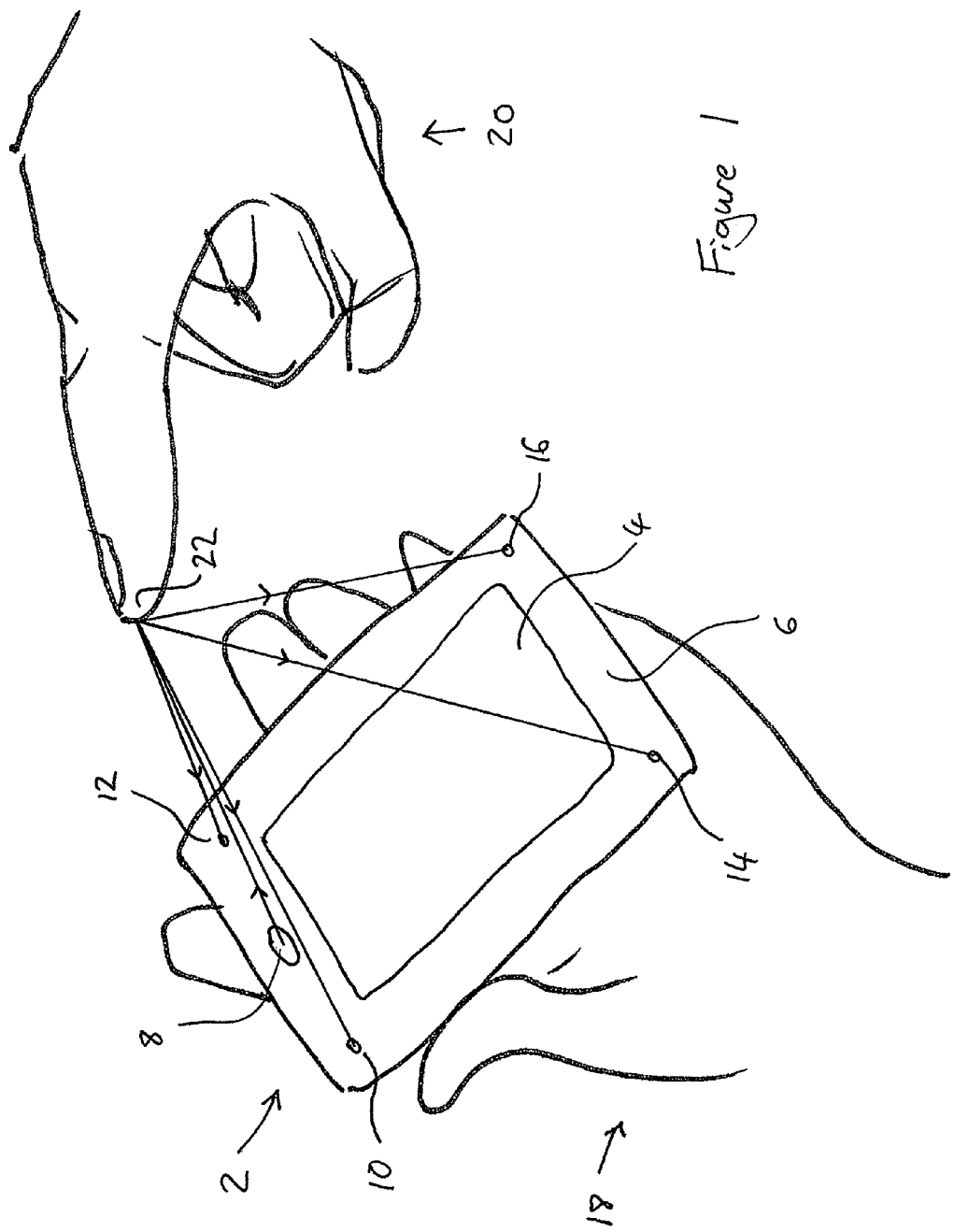
FIG. 1 is an approximate perspective drawing of a handheld device in use, annotated to illustrate a principle of its operation.

FIG. 1 shows a handheld device 2 having a substantially rectangular LCD or OLED screen 4 mounted in a surrounding frame 6. Inside, the device contains well-known processing and communications systems to control the functioning of the device and to interface with the user. Mounted flush with, or recessed into, the surface of the surrounding frame 6 are an ultrasonic emitter 8 (such as a loudspeaker or piezoelectric transducer) and four ultrasonic receivers located in the top-left 10, top-right 12, bottom-left 14 and bottom-right 16 corners of the device. The emitter 8 and receivers 10, 12, 14, 16 are connected to associated circuitry and components, such as analogue-to-digital converters, amplifiers, etc. so as to enable their control by one or more digital processors inside the device. These emitters and transducers may also be used for speech and other audio functions, thereby saving cost. For example, the loudspeaker could be a Hibox HB18E, manufactured by Hibox, Taiwan which has been found to be successfully useable for both speech and ultrasound transmissions. Similarly the microphones could be Sonion SiMic, manufactured by Sonion, Denmark, which have sufficient bandwidth for both acoustic domains. It will be appreciated that other devices may have more transmitters and more or fewer receivers and these need not necessarily all be mounted in a plane, but some could be on an edge or the reverse face of the device.

In use, the device 2 would typically be held in a user's left hand 18 with the display 4 angled towards the user's head (not shown). The user then moves his right hand 20 in the space between the display 4 and his head to effect input signals to the device that cause it to respond in appropriate ways. Of course, equally the right hand may support the device and the left hand be used for input.

The user's input hand 20 may be in any suitable configuration such as a first or with the fingers all substantially parallel. However in FIG. 1, the user's index finger is extended so as to provide a natural pointer at the tip 22 of the finger for detailed input. Such a configuration may be especially useful where input at a high resolution (e.g. to within one or a few pixels of the display screen) is required, for example to control an input cursor. At other times, however, a simpler gesture may suffice (for example, to move from one audio track to another in an audio player application), in which case an extended finger may not be required. The device is able to support both ways of interacting, which may be two quite distinct modes of operation, or which may simply be points on a continuum of degrees of precision.

To characterise the motion of the fingertip 22 (which may be to determine a precise coordinate in space, or which may be to identify a particular gesture from a set of possible gestures), a sequence of ultrasonic chirps is emitted from emitter 8, with intervals of silence between each pair of chirps. Other types of transmit signal may of course be used, and the device may be capable of switching between two or more different types of signal or coding scheme, depending, for example, on the mode of operation, or on the level of background noise. Different chirps may be coded for different receivers, so that every first, second, third and fourth chirp is specific to the top-left 10, top-right 12, bottom-left 14 and bottom-right 16 receiver respectively.

The emitted chirp propagates substantially hemispherically from the emitter 8. One part of the wavefront hits the fingertip 22 of the user's input hand 20, from which it is reflected in many directions. A part of the reflected sound is received by each of the four receivers. Although FIG. 1 shows only a single sound path, it will be understood that sound strikes all parts of the fingertip 22 that are in direct view of the emitter 8, and that each receiver receives sound from many parts of the fingertip 22 at slightly different moments. The receivers are omnidirectional such that each receiver also receives sound from reflections off other parts of the input hand 20, and potentially from other objects in the environment. Unlike an optical camera, which is directional and constructs an image from received light, in the present device, each receiver receives overlaid sounds from different directions without necessarily having any obvious mechanism to distinguish between the directions. This enables a wide field of view from a flush-mounted transducer, but also presents a challenge in processing the received signals to distinguish reflections from an object of interest from those from other objects.

If the timing of received signals from the fingertip 22 can be identified (after a de-chirp operation), an ellipsoid intersection calculation can be performed, using the times-of-flight of the wavefront from the emitter 8 to the fingertip 22 and to each receiver, in order to determine a position estimate for the fingertip, using well known calculations. However, such a step can be computationally expensive and is not always needed, for example, when the device is in a gesture-based input mode.

Figure 2:
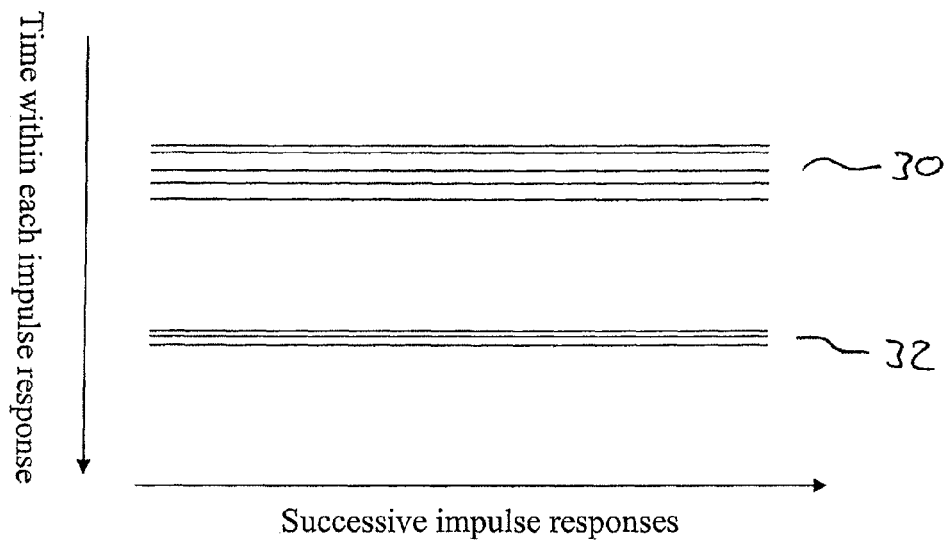
FIG. 2 shows an impulse response image for a channel of the device.

FIG. 2 shows an impulse response image, representative of an intermediate output of the processing performed by the device on the signals received at each of the receivers 10, 12, 14, 16. Although here shown continuously, in practice such an image will typically be stored discretely, serialised in a memory of the device. Successive columns from left to right correspond to the reflections from successive transmit chirps for the receiver, with distance down the column corresponding to later-received reflections. Each vertical column therefore represents a time slot and the horizontal axis is time slot number. The values (here represented by gray-scale intensity) indicate the intensity of the impulse response at that point in time. Since a chirp is transmitted, rather than a single impulse, in order to make use of greater bandwidth, a de-chirp or impulse response calculation step is first performed on the received signals, typically employing a fast Fourier transform.

The group of horizontal lines 30 corresponds to reflections from a static object located relatively near to the device 2, while the group of horizontal lines 32 corresponds to reflections from a static object located further away. There are several lines in each group due to each object having several points, perhaps on different surfaces, that are causing relatively strong reflections back to the receiver.

Figure 3:
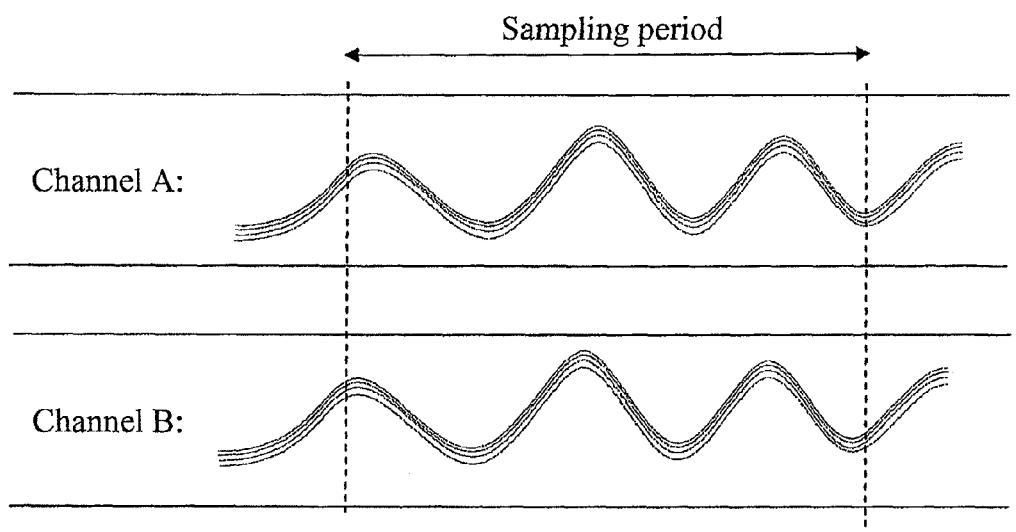
FIG. 3 shows two aligned impulse response images from different channels of the device.

FIG. 3 shows the impulse response on two different channels, A and B, corresponding to the signals received on two different receivers. The columns corresponding to transmit signals occurring at substantially the same time on each channel are vertically aligned. Here an object, such as the users fingertip 22, is continuously moving towards and away from the device, causing the impulse response images to show waving lines. A sampling window, corresponding to the size of a processing buffer, is indicated.

The processor compares the signals in the impulse response image for channel A in the sampling window with those for channel B to identify a similar pattern in each. Here, the received signals are nearly identical, albeit slightly delayed in channel B, so the system would identify a strong match between the channels for the whole pattern depicted. The impulse response images may be compared using known pattern matching techniques. The whole or just a part of each image may be attempted to be matched with the whole or a part of the other image. Where there are more than two channels, a similar pattern may be sought across all of the channels, or across any subset of the channels.

Filters may also be applied to the images to enhance certain features, such as to emphasise the leading or left-most edges of any stripes in the image, and the comparison performed on the filtered images.

Figure 4:
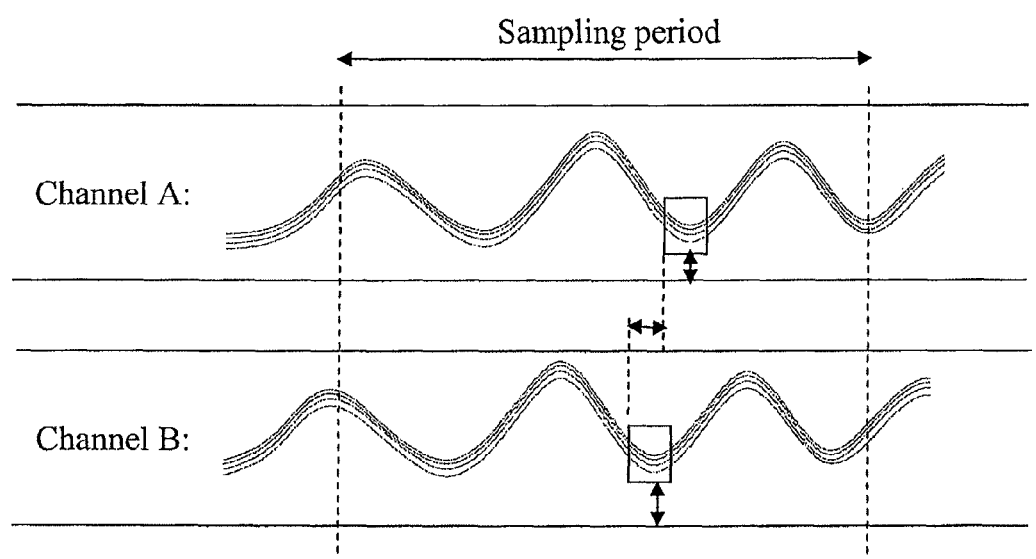
FIG. 4 illustrates the principle of matching within a match region, performed by the device on two impulse response images.

FIG. 4 shows impulse response images from two channels in which a pattern matching operation is performed within match regions that lie within the whole sampling period. The location of the match regions may be chosen based on an earlier analysis step in which parts of the impulse response image(s) that have a relatively high likelihood of containing a reflection from an object of interest are identified.

First, two sets of sampled reflections from two different channels, sampled over two identical or different sampling periods, are determined. The sets, X and Y, relate to potential motion of an object. Next, these two sets are compared. A test is performed to check whether there is an approximate match between the sets (or match regions); i.e. whether $X \approx Y$.

A distance measure, d, between the sets X and Y, is used, and the match regions are said to match if $d(X,Y)<\epsilon$, for some predetermined limit $\epsilon$. The measure here is an $L^p$ norm, but could alternatively be a Frobenius norm, a joint information metric, a Haussdorf norm, a statistical distance metric, or any other suitable metric.

Before this measure, d, is applied, a parameterized transformation, i.e. $f_\alpha(.)$ where $\alpha$ is a parameter vector defining the transformation, may first be applied to signals from one or both channels. The test then becomes, say, whether $f_\alpha(X) \approx Y$ or, equivalently, whether $d(f_\alpha(X),Y)<\epsilon$.

The comparison itself, or the transformation, can be implemented as a filtering step.

Depending on the circumstances, the device 2 may be trying to identify a directly similar pattern in each channel; i.e. one that represents a similar motion for each channel and is visually similar in an impulse response image. However, it may be that the device is testing for an approaching of an object towards the device in one channel and a receding of the same object from the device in another channel. In this instance, such a motion will be identified if there is a similar pattern that is reversed from left to right in one of the channels relative to the other.

Figure 5:
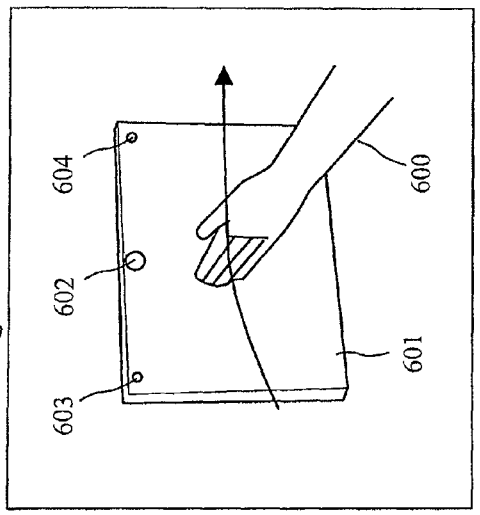
FIG. 5 is a figurative perspective drawing showing an example of a gesture occurring in front of a device having two receivers.
Figure 7:
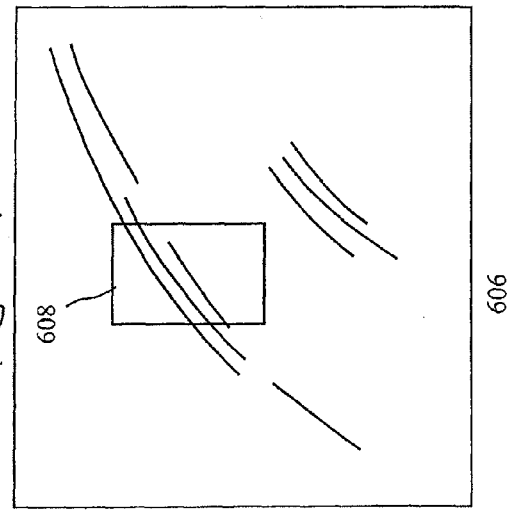
FIG. 7 shows a second-channel impulse response image arising from the gesture of FIG. 5.
Figure 6:
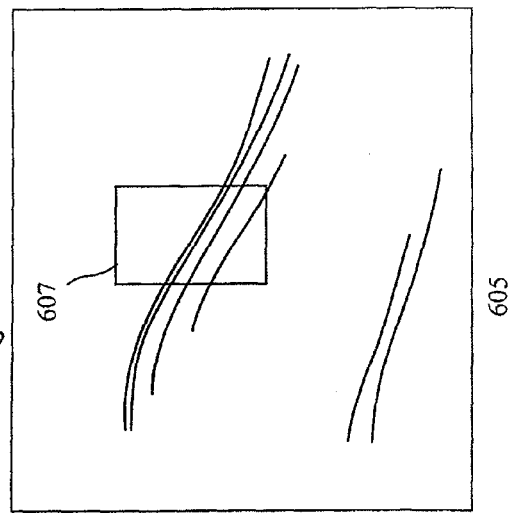
FIG. 6 shows a first-channel impulse response image arising from the gesture of FIG. 5.

In the arrangement of FIG. 5, a user moves his hand 600 in front of a screen 601 having an ultrasound transmitter 602, a left microphone 603 and a right microphone 604. The transmitter 602 and left receiver 603 constitutes a first channel, while the same transmitter 602 and the right receiver 604 constitute a second channel. The transducers are connected via appropriate control circuitry to a CPU (not shown). Chirps are emitted from the transmitter 602, received via direct and reflected paths at the receivers 603, 604, and decorrelated. FIG. 6 illustrates an impulse response image 605 for the first channel. FIG. 7 illustrates an impulse response image 606 for the second channel. In practice, data relating to such images is stored in a memory of the device.

The CPU then detects regions of interest in the two images, and attempts to match the processed signals in these regions. In the present example, at time t, the two detectors will see a 'match' in the blocks 607 and 608 detected in the two channels, where a similar pattern appears directly in the block 607 on the first channel, and appears as horizontal reflection in the block 608 on the second channel. Depending on what motion is to be identified, the CPU may be configured to register matches under a variety of transformations of the similar pattern, including reflections, stretches, rotations, etc. In this instance, from the fact that a vertically-reflected pattern match has occurred, the CPU may infer that either a largely rightwards or a largely leftwards motion has occurred. The precise direction of the movement can be determined from an analysis of the patterns within the blocks themselves and/or an analysis of the relative timings of the matched pattern.

Figure 8:
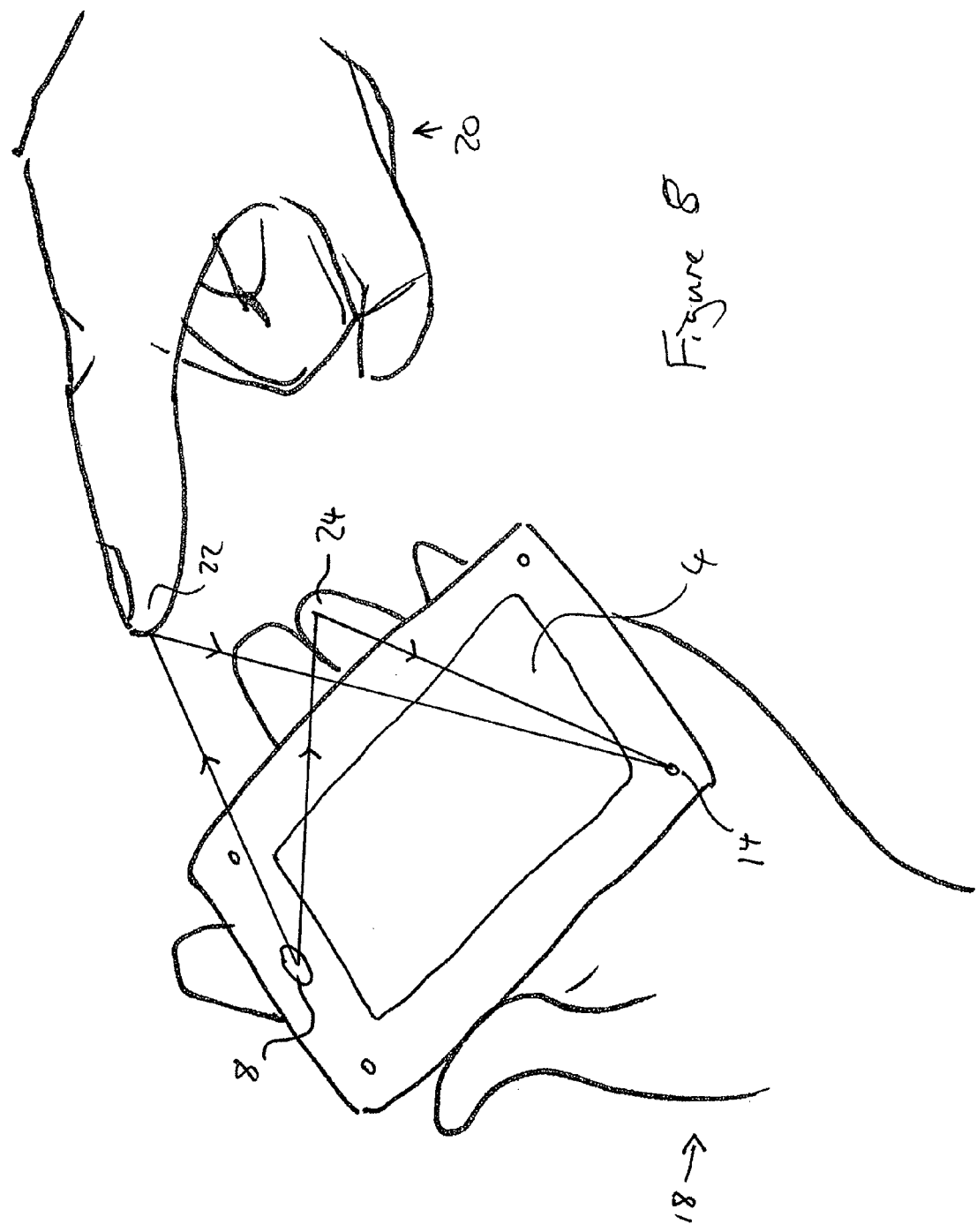
FIG. 8 is an approximate perspective drawings of the device annotated to illustrate the problem of gripping fingers.

FIG. 8 illustrates a problem that can arise when ultrasound input is user on a handheld device. It might normally be assumed that the fingertip 22 that is being used for input would be the closest object (not forming part of the device itself) to the device's screen 4. However, the inventor has appreciated that fingers of a supporting hand 18 may in fact be closer or at approximately the same time-of-flight distance within a channel as the fingertip 22. Due to the complexity of determining a direction-of-arrival of sound at a single receiver, this may not be practicable for a relatively resource-constrained handheld device. Therefore there is a need to distinguish between reflections from the input fingertip 22 and a finger 24 of the supporting hand 18.

Even where it is possible to determine the direction-of-arrival to some extent, for example by providing an array of receivers, or a waveguide that directionally 'colours' the sound, it may nonetheless be advantageous to use additional methods to enhance separation of the signals.

The device 2 therefore uses a number of techniques to reduce interference from a gripping finger 24. Looking for similar patterns between channels has already been described above.

Additionally, the device is able to selectively ignore signals on certain channels (i.e. transmitter-receiver pairs) so as to avoid reducing the accuracy of motion characterisation where a channel contains interference.

Figure 9:
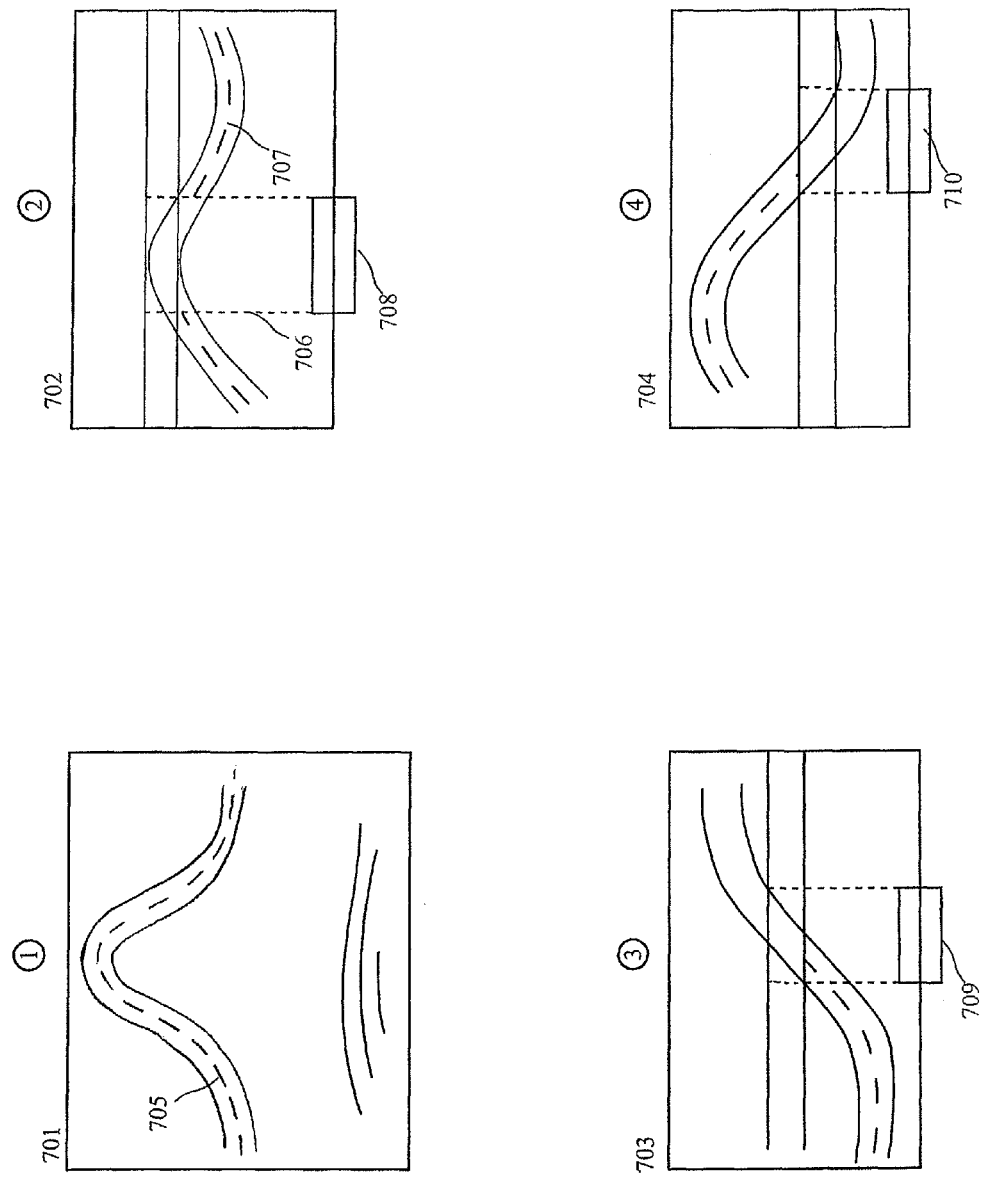
FIG. 9 shows concurrent impulse response images from four channels to illustrate a principle of channel selections.

In one example, a device (not shown) emits ultrasonic chirps from four ultrasonic piezo-electric transmitters while a user moves her hand in a circular fashion in a detection region of the device. Echoes from the hand are recorded via four receivers of the device, and decorrelated. FIG. 9 shows resulting computed impulse response images 701, 702, 703, 704, corresponding to a sampling period for each of the four transmitter-receiver channels. Initially (i.e. at the left of the images), all four channels receive a reflection substantially only from the user's hand, and are therefore 'clear'. The motion of the hand in space can therefore be characterised initially using information from all four channels. Although some noise latter appears in the first channel's image 701, nonetheless the dotted line 705 corresponding to motion of the hand is still easily distinguished from this, as there is no overlap. It is effectively clear throughout the sampling period.

However, the impulse response image 702 for the second channel, the gap in the middle of the dotted tracking line 706, 707 indicates a region in which the echoes from the hand are interfered with by an overlapping echo, due to another object, such as the thumb of the user's gripping finger, being at a similar time-of-flight distance as the hand during this region.

The region, marked with a box 708, represents the time-interval where the channel is not 'clear'.

The impulse response images 703, 704 for channels three and four exhibit similar boxes 709, 710 in which the channel is not 'clear' of interference.

During the periods when any particular channel is not 'clear' it is not used for characterising the motion of the hand. Only the remaining channels are used during these periods. To save power, no processing such as calculating impulse responses, need be carried out on channels not used.

Referring back to FIG. 8, as a further aid to distinguishing the input fingertip 22 from an interfering gripping finger 24, if the device 2 is once able to distinguish between two different surfaces in an impulse response image, it then extrapolates information relating to historical and current reflections from these surfaces so as to make a prediction of its future motion. These hypotheses can enable the device to remain 'locked on' to one or both of the surfaces even during periods of interference between them. For example, if the reflections from two objects in an impulse response image are converging steadily, the device may extrapolate beyond the point at which they meet and subsequently cross over, so as to overcome the interference during the period of overlap by correctly identifying each once they have crossed over. This can be used to predict which channels are going to be 'clear' and therefore selected for processing.

Figure 10:
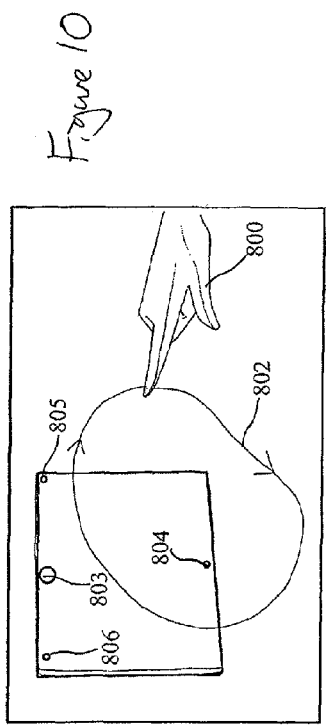
FIG. 10 is a figurative perspective drawing showing a gesture occurring in front of a device having three receivers.

In the arrangement of FIG. 10, a user moves his hand 800 in a circular fashion 801 in front of a screen 802 with one transmitter 803 and three receivers 804, 805, 806, together forming three channels. Chirps are transmitted from the transmitter 803 and impulse responses are computed for each of the three channels.

Figure 11:
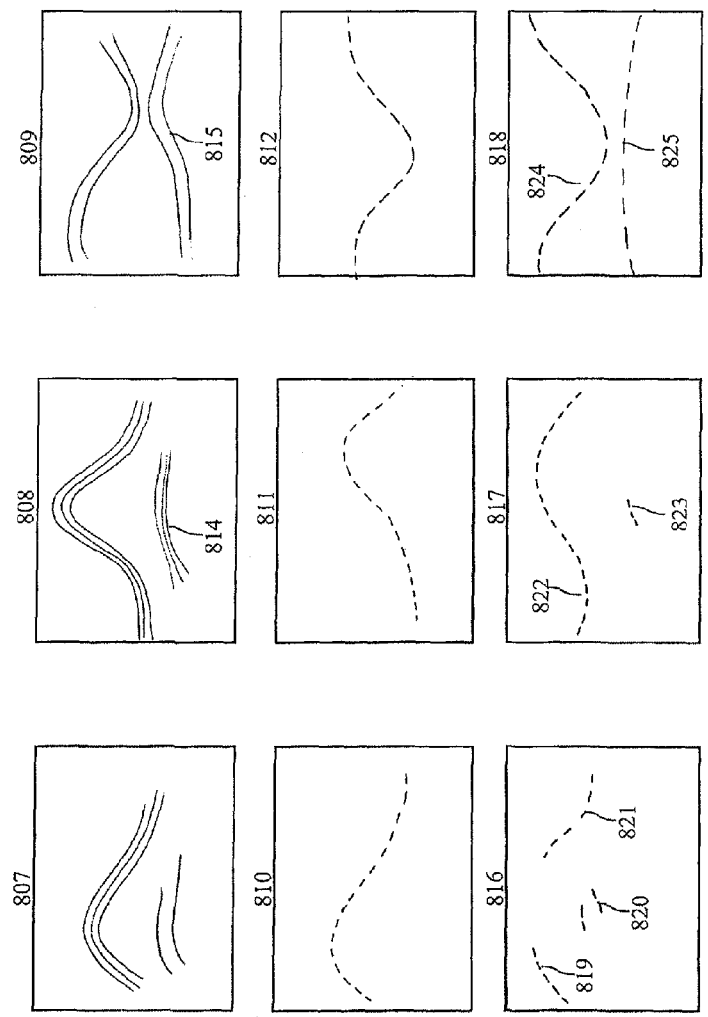
FIG. 11 illustrates impulse response images and subsequent processing steps for three channels of the arrangement of FIG. 10.

FIG. 11 shows the resulting impulse response images 807, 808, 809 for the first, second and third channels respectively. Although the images show paths corresponding to reflections of the hand (indicated for convenience in panels 810, 811, 812), they also contain interfering signals 813, 814, 815.

The system then attempts to track motion of the hand 800 from the combination of the reflections from the hand 800 and the interference as following the paths showing in processed images 816, 817, 818.

Naively, a prior-art system might attempt to track the disjoint paths 819, 820, 821 in the first channel; the disjoint paths 822, 823 in the second channel; and the disjoint paths 824, 825 in the third channel. It would therefore arrive at in incorrect tracking of the motion of the hand 800. However, the present system identifies that a circular motion of the hand gives a more-continuous three-dimensional motion in space than any other conjecture, or, in an alternative embodiment, it determines that a circular motion fits the data better than any other class of gesture from a library of gestures. In either case, once a circular motion is identified, it can ignore those signals 820, 823, 825 that do not fit the hypothesised motion, and instead combine the paths 819, 821, 822, 824 that relate to the true reflections from the hand 800 in order to characterise the motion of the hand in greater detail, if required. If accurate tracking is not required (for example, in a gesture-based input system), the device may simply identify the circling gesture and respond accordingly.

One embodiment matches the set of possible trace combinations with a gesture database using the Random Sample Consensus (RANSAC) method. A conjecture, such as a circle or part of a circle, about the motion of the finger is set out in 3-space. This results in a hypothesized time-of-flight curve for each channel. Points on the traces that are close to the hypothesized time-of-flight curves are labelled as 'inliers'. These 'inliers' are used to construct a continuous motion in 3-space, which becomes an updated motion hypothesis. The procedure is them repeated or iterated. The matching criterion can be related to pixel values or to distances, or it can be initiated from different starting points. In some embodiments, the traces need not be extracted from the impulse response image, and a series of hypothesized curves are inspected by pixel value matching. In either case, the notion of multiple hypotheses is used to track motion of the object of interest.

A prototype gesture recognition system was successfully implemented by the Applicant in MATLAB®. A setup where a speaker of type Hibox® 18E and three microphones of the brand Sonion Simic® were arranged in a rectangular fashion, with one side of the rectangle measuring 5 cm and the other 9 cm. Microphone 1 was diagonally opposite the speaker, while microphone 2 was closer to the speaker than microphone 3 was.

The principle of matching blocks in the time-dimension after suitable filtering of the echo profile was applied. To be precise, the absolute value of the observed impulse response followed by filtering with a Hanning window and subsequent resolution reduction to a factor of ¼th. The latter step was introduced to reduce the subsequent processing requirements, and though some resolution was lost the results were nevertheless satisfactory.

Seven-hundred-and-eighty gestures were sampled from a user carrying out 5 different gestures. These were "left", "right", "up", "down" and "select" and a random, i.e. a non-gestural movement. The "select" or "hit" gesture was characterized by an in-and-out motion towards the rectangular aperture. Two levels of matching were used, the match between microphone 1 and 2 and the match between microphone 1 and 3. For each of these pairs, a matching vector was computed. The matching vector indexes were the covariances given a relative shift in the range of −5 to 5 frame shifts, giving a vector length of 11. Each of the two vectors output, herein termed $\underline{s12}$ and $\underline{s13}$ was then normalized in two steps, first by removing the mean and then by scaling to unit norm. These steps make the subsequent processing robust to fluctuations in the amplitudes and strengths of the impulse response signals. Finally, the two vectors $\underline{12}$ and $\underline{s13}$ were concatenated into a single vector $\underline{s}$. We can then represent every point in the dataset by a singles vector of length 22, and we hereafter term the full set of gestures $S=\{s_1, s_2, \ldots\}$.

Figures 12, 13:
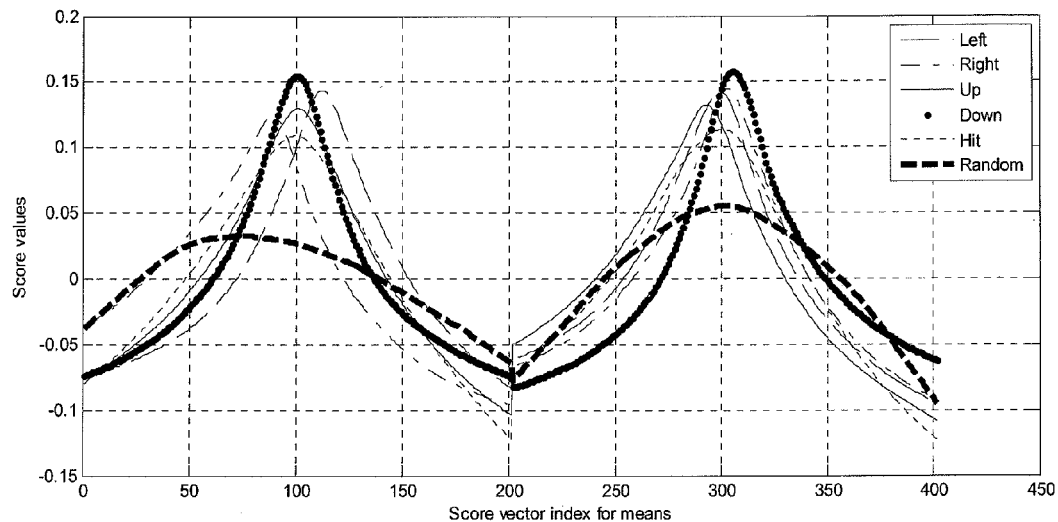
FIG. 12 is a graph of mean vectors based on experimental data.
FIG. 13 is a table of gesture classification results based on experimental data.

FIG. 12 shows the mean vectors for each of the classes Left, Right, Up, Down and Select (or Hit), and Random.

There are clearly visible "shifts" in the mean peak that suggest that the classes of gestures, at least in the mean sense, are separable from one another. Note for instance that the class of random motions is quite different from the other classes. This suggest that unintentional motions, i.e. fingers or hands coming close to the devices but not carrying out a proper gesture, can be detected to avoid false alarms.

Classification was carried out by dividing the data into a training set (67% of the gestures) and a test set (33% of the gestures). The vectors held in the test set were projected onto a set of principal components extracted from the training set using principal component analysis with 7 components, and a k-nn classification algorithm with k=3 used on the resulting principal components projection coefficients. Unprojected versions of the algorithm, as well as simpler classifiers such a quadratic and linear discriminant functions were also evaluated with similar results. However, the k-nn classifier performs better, which is due to its ability to model non-linear and non-quadratic gesture class separators. Since the underlying data generation process is highly non-linear in its nature, complex boundaries between classes are to be expected.

In classifying the gestures, a balance need to be struck with respect to how many gestures are discarded as being "unclear", i.e. not sufficiently well observed to put into any of the above classes. By allowing a certain percentage of gestures to be put into this class, one can obtain a better result for the gestures which are sufficiently clear for classification. In practice, this amounts to a reduction in erroneous gestures (i.e. "left" motions being interpreted as "up" motions), which can be particularly annoying for the user, at the expense of discarding some of the more doubtful or unclear gestures, which by the user can be experienced as the system being less responsive.

FIG. 13 shows a table of the results of the classification approach. It shows the 'confusion matrix', i.e. the number of samples from class X assigned to class Y during the steps of classifications. Ideally, all off-diagonal elements would be zero, but in reality, there will be some confusion. The rows are representative of the true classes (i.e. "C"), whereas the columns are representative of the estimated classes ("C^"). It can for instance be seen that 4% of the "Up" gestures were erroneously classified as "Left" gestures. Summarizing the findings in the column second farthest to the right, it is seen that among all the "Left" gestures which were not considered as "too vague" for classification, 96% were correct. Similarly, among the "Right" gestures, 93% were correct etc. The total percentage of gesture considered too vague in this experiment was 12.6% (not shown in the table above).

Note that in the above, one model was used for all the gestures in the set. In a more computationally-intensive embodiment, different models could be used at different gesture ranges. For instance, when gestures are carried out very close to the device, there tends to be quite a large perspective shift as the hand moves past the sensor configuration. When the gestures are carried out further away, the perspective remains more constant. Making a distinction between gesture models at short and far ranges allows for better use of the parameters describing the principal component model or other empirical data model.

The model could be further subdivided into a succession of models, each one most relevant for a specific distance/range of movements. This has the additional benefit in providing a simple means for detecting gesture depth: the index of the range model which best describes the observed gesture data gives an approximate gesture distance. This information can in turn be used to modify the action occurring on the screen. For instance, a gesture occurring close to a device may have a different meaning from a gesture occurring further from the device. A close "downwards" gesture could for instance lead to a slight downwards scroll of the on-screen content, whilst a "downward" gesture at a further range could lead to a scroll of multiple pages.

More generally, in any suitable touchless, acoustic input system, different algorithms can be used at different ranges. At close ranges, where perspective changes are abrupt, a time-domain matching method like the one described above may be ideal. At middle ranges, where some common points are visible, block-based matching or even time-of-flight-extraction followed by ellipsoid intersections may be useful. At yet further ranges, the system becomes sensitive to errors in the time-of-flight estimation, whilst gradually the perspective of the object seen by two neighbouring sensors becomes more and more similar. Under these circumstances, vertical shift methods become more robust, since they don't depend on solving a set of equations that are at best highly sensitive to errors, and at worst, have no solution at all.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the claims that follow.

The invention claimed is:

1. A method of characterising the motion of an object comprising:
   transmitting a plurality of acoustic transmit signals over first and second channels provided on a single device, said first channel comprising a first transmitter and a first receiver and said second channel comprising one of the three options comprising said first transmitter and a second receiver, a second transmitter and said first receiver, and a second transmitter and a second receiver;
   a first set of said transmit signals being reflected from an object in motion at a first set of times to form a first set of reflected signals;
   receiving said first set of reflected signals over said first channel;
   generating a first impulse response image comprising at least one of the group: impulse responses calculated from the first set of reflected signals; an offset, negated or linearly scaled transformation of impulse responses calculated from the first set of reflected signals; and an envelope of impulse responses calculated from the first set of reflected signals;
   a second set of said transmit signals being reflected from the object in motion at a second set of times to form a second set of reflected signals;
   receiving said second set of reflected signals over said second channel;
   generating a second impulse response image comprising at least one of the group: impulse responses calculated from the second set of reflected signals; an offset, negated or linearly scaled transformation of impulse response responses calculated from the second set of reflected signals; and an envelope of impulse response responses calculated from the second set of reflected signals;
   comparing the first impulse response image with the second impulse response image to identify, in the first impulse response image, a first pattern arising from the motion and, in the second impulse response image, a second pattern arising from the motion; and
   using one or more relative timing differences between the channels, associated with the first and second patterns to characterise the motion of the object as "Left", "Right", "Up", "Down", "Select" or "Too Vague".

2. A method as claimed in claim 1 comprising using the motion characterisation to control an electronic device.

3. A method as claimed in claim 1 comprising processing one or more of the first and second set of reflected signals using one or more processes selected from the group consisting of: amplification, sampling, analogue filtering, digital filtering, envelope extraction, distortion in time, linear transformation, non-linear transformation, complex transformation, frequency-domain transformation, and time-frequency-domain transformation.

4. A method as claimed in claim 1 comprising using a temporal offset between the first and second sets of times to characterise the motion of the object.

5. A method as claimed in claim 4 wherein the temporal offset is greater than a minimum amount selected from the group consisting of: 0.5 milliseconds; 1 millisecond; 1.5 milliseconds; the time it takes a signal to travel to an object at the periphery of a predetermined detection range; the time it takes a signal to travel to and from an object at the periphery of a predetermined detection range; the maximum time-of-flight difference between the two channels for a given signal; and, for periodic transmit signals, the period of the transmit signals or a multiple of said period.

6. A method as claimed in claim 1 wherein the transmit signals are periodic.

7. A method as claimed in claim 1 wherein the transmit signals are composed of a series of pulses.

8. A method as claimed in claim 1 wherein the transmit signals comprise one or more chirps.

9. A method as claimed in claim 1 wherein the comparison step is carried out on at least a portion of a filtered signal.

10. A method as claimed in claim 1 comprising transmitting acoustic transmit signals over more than two channels, each channel comprising at least one transmitter and at least one receiver, wherein the received signals on each channel comprise reflections from the object.

11. A method as claimed in claim 1 comprising transmitting acoustic transmit signals from a plurality of transmitters wherein the transmit signal is encoded differently for each transmitter.

12. A method as claimed in claim 1 comprising calculating a variance parameter between said two impulse response images, and applying a threshold variance to determine whether said first and second patterns are similar or not.

13. A method as claimed in claim 1 comprising performing a cross-correlation between said first and second sets impulse response images.

14. A method as claimed in claim 1 wherein the first pattern is a transformation of the second pattern.

15. A method as claimed in claim 1 comprising applying a transformation to one of said first impulse response image, said second impulse response image and said first and second impulse response images before comparing said first and second patterns.

16. A method as claimed in claim 1 comprising dithering the transmit signals in time, and applying an inverse dithering to the first and second sets of reflected signals.

17. A method as claimed in claim 1 wherein the first and second patterns comprise intensity contours in said first and second impulse response images.

18. A method as claimed in claim 1 comprising applying one or more filters to the first and second impulse response images selected from the set of filters consisting of: filters that pass signals corresponding to a set of trajectories of motion of the object; filters to enhance a motion trend in the received signals; filters to detect motion of the object in the presence of noise; filters to remove contributions from slowly-moving objects; filters to remove contributions from still objects; filters to remove contributions where it can be determined that two objects are overlapping in time-of-flight distance; response image edge filters; and Constant False Alarm Rate filters.

19. Apparatus for characterising the motion of an object comprising:
a transmission subsystem arranged to transmit a plurality of acoustic signals;
a receiving subsystem arranged to receive first and second sets of reflected signals comprising respective sets of reflections of said acoustic signals from the object in motion at first and second sets of times and, with the transmission subsystem, defining first and second channels; and
a processing subsystem configured to:
generate a first impulse response image comprising at least one of the group: impulse responses calculated from the first set of reflected signals; an offset, negated or linearly scaled transformation of impulse responses calculated from the first set of reflected signals; or an envelope of impulse responses calculated from the first set of reflected signals;
generate a second impulse response image comprising at least one of the group: impulse responses calculated from the second set of reflected signals; an offset, negated or linearly scaled transformation of impulse responses calculated from the second set of reflected signals; or an envelope of impulse responses calculated from the second set of reflected signals;
compare the first impulse response image with the second impulse response image to identify, in the first impulse response image, a first pattern arising from the motion and, in the second impulse response image, a second pattern arising from the motion; and
use one or more relative timing differences between the channels, associated with the first and second patterns to characterise the motion of the object as "Left", "Right", "Up", "Down", "Select" or "Too Vague".

20. Apparatus as claimed in claim 19 wherein the transmission and receiving subsystems define more than two channels.

21. Apparatus as claimed in claim 19 comprising at least one transmitter that is shared by a plurality of channels.

22. Apparatus as claimed in claim 19 comprising at least one receiver that is shared by a plurality of channels.

23. A non-transitory computer-readable medium comprising instructions that when executed by a computer causes the computer to perform a method of characterizing the motion of an object comprising:
transmitting a plurality of acoustic transmit signals over first and second channels provided on a single device, said first channel comprising a first transmitter and a first receiver and said second channel comprising one of the three options comprising said first transmitter and a second receiver, a second transmitter and said first receiver, and a second transmitter and a second receiver;
a first set of said transmit signals being reflected from an object in motion to form a first set of reflected signals;
receiving said first set of reflected signals over said first channel;
generating a first impulse response image comprising at least one of the group: impulse responses calculated from the first set of reflected signals; an offset, negated or linearly scaled transformation of impulse responses calculated from the first set of reflected signals; or an envelope of impulse responses calculated from the first set of reflected signals;
a second set of said transmit signals being reflected from the object in motion at a second set of times to form a second set of reflected signals;

receiving said second set of reflected signals over said second channel;

generating a second impulse response image comprising at least one of the group: impulse responses calculated from the second set of reflected signals; an offset, negated or linearly scaled transformation of impulse responses calculated from the second set of reflected signals; or an envelope of impulse responses calculated from the second set of reflected signals;

comparing the first impulse response image with the second impulse response image to identify, in the first impulse response image, a first pattern arising from the motion and, in the second impulse response image, a second pattern arising from the motion; and using one or more relative timing differences between the channels, associated with the first and second patterns, to characterise the motion of the object as "Left", "Right", "Up", "Down", "Select" or "Too Vague".

24. A method of characterising the motion of an object comprising:

continuously transmitting an acoustic transmit signal over first and second channels provided on a single device, said first channel comprising a first transmitter and a first receiver and said second channel comprising one of the three options comprising said first transmitter and a second receiver, a second transmitter and said first receiver, and a second transmitter and a second receiver;

a first portion of said transmit signals being reflected from an object in motion over a first range of time to form a first reflected signal portion;

receiving said first reflected signal portion over said first channel;

generating a first impulse response image comprising at least one of the group: impulse responses calculated from the first reflected signal portion; an offset, negated or linearly scaled transformation of impulse responses calculated from the first reflected signal portion; or an envelope of impulse responses calculated from the first reflected signal portion;

a second portion of said transmit signal being reflected from the object in motion over a second range of time to form a second reflected signal portion;

receiving said second reflected signal portion over said second channel;

generating a second impulse response image comprising at least one of the group: impulse responses calculated from the second reflected signal portion; an offset, negated or linearly scaled transformation of impulse responses calculated from the second reflected signal portion; or an envelope of impulse responses calculated from the second reflected signal portion;

comparing the first impulse response image with the second impulse response image to identify, in the first impulse response image, a first pattern arising from the motion and, in the second impulse response image, a second pattern arising from the motion; and using one or more relative timing differences between the channels, associated with the first and second patterns, to characterise the motion of the object as "Left", "Right", "Up", "Down", "Select" or "Too Vague".

25. A non-transitory computer-readable medium comprising instructions that when executed by a computer causes the computer to perform a method of characterizing the motion of an object comprising:

continuously transmitting an acoustic transmit signal over first and second channels provided on a single device, said first channel comprising a first transmitter and a first receiver and said second channel comprising one of the three options comprising said first transmitter and a second receiver, a second transmitter and said first receiver and a second transmitter and a second receiver;

a first portion of said transmit signal being reflected from an object in motion to form a first reflected signal portion;

receiving said first reflected signal portion over said first channel;

generating a first impulse response image comprising at least one of the group: impulse responses calculated from the first reflected signal portion; an offset, negated or linearly scaled transformation of impulse responses calculated from the first reflected signal portion; or an envelope of impulse responses calculated from the first reflected signal portion;

a second portion of said transmit signal being reflected from the object in motion over a second range of time to form a second reflected signal portion;

receiving said second reflected signal portion over said second channel;

generating a second impulse response image comprising at least one of the group: impulse responses calculated from the second reflected signal portion; an offset, negated or linearly scaled transformation of impulse responses calculated from the second reflected signal portion; or an envelope of impulse responses calculated from the second reflected signal portion;

comparing the first impulse response image with the second impulse response image to identify, in the first impulse response image, a first pattern arising from the motion and, in the second impulse response image, a second pattern arising from the motion; and using one or more relative timing differences between the channels, associated with the first and second patterns, to characterise the motion of the object as "Left", "Right", "Up", "Down", "Select" or "Too Vague".

* * * * *